United States Patent
De Lega et al.

(10) Patent No.: US 7,046,371 B2
(45) Date of Patent: May 16, 2006

(54) INTERFEROMETER HAVING A COUPLED CAVITY GEOMETRY FOR USE WITH AN EXTENDED SOURCE

(75) Inventors: Xavier Colonna De Lega, Middletown, CT (US); Peter J. De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 258 days.

(21) Appl. No.: 10/464,163

(22) Filed: Jun. 17, 2003

(65) Prior Publication Data

US 2004/0012791 A1 Jan. 22, 2004

Related U.S. Application Data

(60) Provisional application No. 60/389,748, filed on Jun. 17, 2002.

(51) Int. Cl.
*G01B 9/02* (2006.01)

(52) U.S. Cl. .......................... 356/511; 356/497

(58) Field of Classification Search ............... 356/479, 356/497, 511–514
See application file for complete search history.

(56) References Cited

U.S. PATENT DOCUMENTS

| | | | |
|---|---|---|---|
| 4,340,306 A | 7/1982 | Balasubramanian | 356/360 |
| 4,627,728 A | 12/1986 | Willson | 356/345 |
| 4,872,755 A | 10/1989 | Küchel | 356/360 |
| 4,948,253 A * | 8/1990 | Biegen | 356/495 |
| 5,398,113 A | 3/1995 | de Groot | 356/360 |
| 5,631,736 A | 5/1997 | Thiel et al. | 356/349 |
| 5,784,164 A | 7/1998 | Deck et al. | 356/359 |
| 5,847,827 A * | 12/1998 | Fercher | 356/493 |
| 5,991,035 A * | 11/1999 | Bruning | 356/512 |
| 6,154,279 A | 11/2000 | Thayer | 356/376 |
| 6,195,168 B1 * | 2/2001 | De Lega et al. | 356/497 |
| 6,813,029 B1 * | 11/2004 | Lindner et al. | 356/497 |
| 2003/0043385 A1 * | 3/2003 | Kuchel | 356/513 |
| 2004/0012791 A1 * | 1/2004 | Lega et al. | 356/497 |
| 2004/0027576 A1 * | 2/2004 | De Groot et al. | 356/498 |
| 2004/0036890 A1 * | 2/2004 | Nakayama et al. | 356/513 |
| 2004/0239947 A1 * | 12/2004 | De Groot et al. | 356/512 |

FOREIGN PATENT DOCUMENTS

| | | |
|---|---|---|
| DE | 100 47 495 A1 | 10/2001 |
| DE | 101 15 524 A1 | 11/2001 |

(Continued)

OTHER PUBLICATIONS

Boppart et al., "Forward-imaging instruments for optical coherence tomography", *Optics Letters*, vol. 22, No. 21, pp. 1618-1620 (Nov. 1, 1997).

(Continued)

*Primary Examiner*—Gregory J. Toatley, Jr.
*Assistant Examiner*—Patrick J. Connolly
(74) *Attorney, Agent, or Firm*—Fish & Richardson P.C.

(57) ABSTRACT

In certain aspects, the invention features an interferometry system that utilizes coupled cavities (e.g., at least one remote cavity and a main cavity) and an extended light source. The remote cavity and the main cavity can have similar optical properties (e.g., similar numerical apertures (NA's)), allowing them to introduce offsetting, and therefore compensating, non-zero optical path differences (OPD's) between the measurement and reference beams without degrading interference fringe contrast due to source spatial coherence. In other words, for each non-zero OPD in the main cavity there exists a configuration of the remote cavity such that the total OPD between test and reference chief rays, and between test and reference marginal rays is substantially zero.

47 Claims, 9 Drawing Sheets

FOREIGN PATENT DOCUMENTS

| | | |
|---|---|---|
| DE | 100 39 239 A1 | 3/2002 |
| EP | 0 623 802 A2 | 11/1994 |
| WO | WO 01/27558 | 4/2001 |
| WO | WO 01 27558 * | 4/2001 |
| WO | WO 01/75395 | 10/2001 |
| WO | WO 02/12825 A1 | 2/2002 |
| WO | WO 02/14845 | 2/2002 |

OTHER PUBLICATIONS

Blümel et al., "Absolute interferometric calibration of toric and conical surfaces", *SPIE* vol. 3134, pp. 370-378 (Jul. 1997).

Brinkman et al., "Testing of rod objects by grazing-inidence interferometry: experiment", *Applied Optics*, vol. 38, No. 1, pp. 121-125 (Jan. 1, 1999).

Chakmakjian et al., "Simultaneous focus and coherence scanning in interference microscopy", *Technical Digest, International Workshop on Interferometry*, 171 (Riken, Japan, 1996).

Dresel et al., "Three-dimensional sensing of rough surfaces by coherence radar", *Applied Optics*, vol. 31, No. 7, pp. 919-925 (Mar. 1, 1992).

Li et al., "Imaging needle for optical coherence tomography", *Optics Letters*, vol. 25, No. 20, pp. 1520-1522 (Oct. 15, 2000).

Lindner et al., "White-light interferometry via an endoscope", *SPIE*, vol. 4777, pp. 90-101 (Jul. 2002).

Matthys et al., "Panoramic Holointerferometry", *Experimental Mechanics*, vol. 35, No. 1, pp. 83-88 (Mar. 1995).

Schwider, "White-light Fizeau interferometer", *Applied Optics*, vol. 36, No. 7, pp. 1433-1437 (Mar. 1, 1997).

Zhou et al., "Surface profile measurements using a white light Linnik interferometer", *Annual Report Lehrstuhl für Optik, Univ. Elrlangen-Nürnberg* pp. 69 (1996).

Masaya Kinoshita et al., "Optical frequency-domain imaging microprofilometry with a frequency-tunable liquid-crystal Fabry-Perot etalon device", *Applied Optics*, vol. 38, No. 34, pp. 7063-7068 (Dec. 1, 1999).

* cited by examiner

OPD = MNP = M'NP − P'P = M'NP − P"P = M'NP" = 2d cos(α)

INTERFEROMETER HAVING A COUPLED CAVITY GEOMETRY FOR USE WITH AN EXTENDED SOURCE

CROSS-REFERENCE TO RELATED APPLICATIONS

This application claims priority to Provisional Patent Application No. 60/389,748, entitled "INTERFEROMETER HAVING A COUPLED CAVITY GEOMETRY WITH MATCHED NUMERICAL APERTURE FOR USE WITH AN EXTENDED SOURCE," filed on Jun. 17, 2002, the entire contents of which is hereby incorporated by reference.

TECHNICAL FIELD

This invention relates to optical metrology.

BACKGROUND

Instruments for profiling surfaces are generally classified as either contact or noncontact types. With contact types, a stylus is used to mechanically move over the surface while in physical contact with it to build up information about surface features including their position and scale. Noncontact types are usually optically based and may be either scanning types or full-field types depending on whether or not a probe is moved over a surface in the manner of a stylus but not in contact with the surface or an area larger than that measured by a probe is imaged all at once.

Optical metrology of surface profiles can generally be divided into two regimes, namely interferometric and geometric. Geometric techniques include triangulation and moire fringe analysis, which involves the projection and imaging of a periodic structure such as a Ronchi ruling. Geometric techniques are relatively insensitive to surface roughness and deformations, but are of relatively low resolution thus making them unsuitable for many applications in which surface profiles must be measured with high precision.

Interferometry, on the other hand, relies on the wave nature of light for high precision measurement of the surface profile of a test object. A typical interferometer includes a light generator that produces a beam of light followed by a beam divider that splits the beam into reference and measurement beams. The reference beam is then reflected off a reference surface, and the measurement beam off the object whose surface is to be profiled. First and second reflected wavefronts from the reference and measurement surfaces are then recombined with one another while interfering both constructively and destructively to produce an interference fringe pattern at a detector, the fringe pattern being a function of the optical path difference between the paths traveled by the reference and measurement beams. The optical path difference results in differences in phase as a result of the differences in optical path traveled between the reference and measurement beams. An imaging device, such as a solid state camera, receives the recombined wavefronts and acquires images of the interference fringe pattern. The interference fringe pattern then is analyzed to obtain information about the surface profile of the test object.

Fringe pattern analysis for surface profilometry often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., 1/100) of the optical wavelength of the light source used to conduct the measurement. A second advantage of PSI is that it has good vibration immunity characteristics because phase data is acquired for all pixels simultaneously and because the data acquisition time is relatively short.

Generally speaking, however, conventional PSI approaches can profile only smooth surfaces having relatively small height variations or "surface departures" between adjacent measurement sites (the maximum height deviation that can be accommodated is +/− one quarter wavelength) since conventional interferometry on a surface with high slopes generates such a high fringe density that no meaningful information can be derived from the fringe pattern. Therefore, while PSI interferometry is much more precise than geometric optical profilometry, it historically has been considered to be ill-suited for use with rough objects or objects having marked surface deformations.

One interferometric technique that lacks the quarter-wavelength constraint of PSI is the so-called scanning white light interferometry or SWLI. In SWLI, a white light illumination source or, more generally, one which is of a broad-band spectrum as opposed to being of a narrow-band spectrum (e.g., a laser), generates an interference pattern which contains, as a function of scan position, regions of high contrast for each location on the test surface. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

In some embodiments, SWLI can be refined using phase measurement techniques to provide the same resolution as PSI while being able to measure discontinuous surfaces.

Examples of manufactured items requiring metrology include engine parts, components for magnetic storage devices, flat-panel displays, molded and textured plastic surfaces, mechanical pump surfaces and seals, and minted coins. In these and other Industrial Markets, there is a significant and growing need for fast, accurate metrology of parts having non-flat prismatic surfaces. Each type of item requiring metrology can place a unique set of demands on the metrology tool. For instance, planar surfaces, such as those of a flat panel display, are preferably probed by nominally planar wavefronts, while conical surface, such as the surface of a valve seat is more effectively probed with a spherical wavefront. Furthermore, some surfaces can be deeply recessed within narrow cylindrical holes, making precise metrology even more challenging. Accordingly, a user will typically employ an application specific metrology tool having an optical configuration optimized for the specific task.

SUMMARY

In certain aspects, the invention features an interferometry system that utilizes coupled cavities (e.g., at least one remote cavity and a main cavity) and an extended light source. The remote cavity and the main cavity can have similar optical properties (e.g., similar numerical apertures (NA's)), allowing them to introduce offsetting, and therefore compensating, non-zero optical path differences (OPD's) between the measurement and reference beams without degrading interference fringe contrast due to source spatial coherence. In other words, for each non-zero OPD in the main cavity there exists a configuration of the remote cavity such that the total OPD between test and reference chief rays, and between test and reference marginal rays is substantially zero (e.g., less than $\lambda$, the mean wavelength of the source, such as less than 0.5 $\lambda$, 0.1 $\lambda$). In some embodiments, the chief rays are generated by an on-axis source point (i.e., a source point that is coincident with an optical axis of the system) and marginal rays are generated by off-axis source points.

The configuration of the main cavity can be changed to accommodate different test surfaces. For example, a first configuration can be used for profiling a nominally planar test surface, while a second configuration can be used for profiling a conical surface. The balance of the components (e.g., the detector and the remote cavity) can remain unchanged.

Embodiments can include using low coherence interferometry (e.g., broadband light sources, such as a light emitting diode or an incandescent bulb) or phase shifting interferometry (e.g., using a highly coherent source, such as a laser).

The main cavity and the remote cavity can be polarized so as to maintain separation of the measurement and reference beams even though they may be recombined spatially during transmission to and from the main cavity and the remote cavity. Alternatively, or additionally, where a low coherence source is used, the reference and measurement beams can be distinguished from each other by coherence multiplexing.

In some embodiments, provision is made for an independent and simultaneous scan of the focus position.

Embodiments can include more than one remote cavity, including multiple remote cavities with different optical characteristics (e.g., different NA's).

In general, in one aspect, the invention features a method including: imaging test light reflected from a test surface to interfere with reference light on a camera and form an interference pattern, the test light and reference light being derived from a common source, having a mean wavelength $\lambda$, and including chief rays and marginal rays, wherein the test light and reference light propagate along different paths in a main cavity including the test surface and at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and adjusting the optical path difference $\delta_r$ to vary a total optical path difference between the chief rays at the camera, wherein the imaging includes coupling the test light and reference light between the cavities to cause a total optical path difference between the marginal rays of the test and reference light at the camera to be smaller than $\lambda$ when the total optical path difference between the chief rays of the test and reference light at the camera is zero.

Embodiments of the method may include any of the following features.

The common source may be an extended common source. For example, the imaging of the light derived from the extended common source may cause the main cavity to introduce an optical path difference of at least about $\lambda$ between a marginal ray and a chief ray of test light incident on a common point of the test surface when $\delta_0$=10 mm.

The test and reference light may make two passes through the remote cavities and one pass through the main cavity, the first pass through the remote cavities is from the common source to the main cavity and the second pass through the remote cavities is from the main cavity to the camera. In this case, the total optical path difference for the chief rays may be equal to $\delta_0+2\delta_r$.

The common source may have a temporal coherence length, and the optical path difference $\delta_r$ may be adjusted over a range sufficient to cause the total optical path difference for the chief rays to vary over a range larger than the temporal coherence length.

The optical path difference $\delta_r$ may be adjusted over a range sufficient to cause the total optical path difference for the chief rays to pass through zero.

The method may further include recording images of the interference pattern with the camera as a function of the adjusted optical path difference.

The at least one remote cavity may include only one remote cavity, in which case the single pass through the remote cavity introduces the optical path length difference $\delta_r$ between the chief rays.

The imaging may produce an intermediate image of the test surface in the remote cavity that has an inverse magnification s that satisfies:

$$1 - \frac{1.2\lambda}{\delta_0 \alpha_m^2} < s^2 < 1 + \frac{1.2\lambda}{\delta_0 \alpha_m^2},$$

where $\alpha_m$ is a maximum ray angle for a marginal ray relative to a chief ray for test light on the test surface.

The imaging may include coupling the test light and reference light between the main cavity and the remote cavity with unit magnification. For example, the coupling may include coupling the test light and reference light between the main cavity and the first cavity using 1:1 relay optics. Alternatively, the coupling may include directly coupling the test light and reference light between the main cavity and the remote cavity without using any element having optical power.

The at least one remote cavity may include a first remote cavity and at least a second remote cavity. Adjusting the optical path difference $\delta_r$ may include adjusting an optical path difference between the test light and reference light in the first remote cavity, the second remote cavity, or both first and second remote cavities. The method may further include recording images of the interference pattern with the camera as a function of the adjusted optical path length difference in the first and second remote cavities.

The test surface may be planar.

The chief rays for the test and reference light may define an optical measurement surface corresponding to a theoretical test surface that would reflect the chief rays of the test light to produce a zero optical path length difference between them and the chief rays of the reference light over the camera, and the imaging may further include directing the test light to contact the test surface such that the adjustment of the optical path difference $\delta_r$ scans a position of a locally planar portion of the optical measurement surface over at least a portion of the test surface.

The test surface may be curved.

The chief rays for the test and reference light define an optical measurement surface corresponding to a theoretical test surface that would reflect the chief rays of the test light to produce a zero optical path length difference between them and the chief rays of the reference light over the camera, and the imaging may further include directing the test light to contact the test surface such that the adjustment of the optical path difference $\delta_r$ scans a radius of a locally spherical portion of the optical measurement surface over at least a portion of the test surface.

The main cavity and the remote cavities may direct the test light and reference light along their different paths using polarizing beam splitting surfaces.

The main cavity and the remote cavities may direct the test light and reference light along their different paths using non-polarizing beam splitting surfaces.

The chief rays for the test and reference light may define an optical measurement surface corresponding to a theoretical test surface that would reflect the chief rays of the test light to produce a zero optical path length difference between them and the chief rays of the reference light over the camera, and the imaging further includes adjusting a position of the camera relative to an image of the optical measurement surface nearest the camera while adjusting the optical path difference $\delta_r$. For example, the position of the camera relative to the image of the optical measurement surface may be adjusted while adjusting the optical path difference $\delta_r$ to maintain the optical measurement surface within a depth of focus of an imaging system used to image the test light to the camera.

The total optical path difference between the marginal rays of the test and reference light at the camera may be smaller than 0.5 $\lambda$ when the total optical path difference between the chief rays of the test and reference light at the camera is zero.

The total optical path difference between the marginal rays of the test and reference light at the camera may be smaller than 0.1 $\lambda$ when the total optical path difference between the chief rays of the test and reference light at the camera is zero.

In general, in another aspect, the invention features a method including: imaging test light reflected from a test surface to interfere with reference light on a camera and form an interference pattern, wherein the test light and reference light are derived from an extended, common source, and wherein the test light and reference light propagate along different paths in a main cavity including the test surface and a remote cavity; adjusting an optical path difference between the test light and reference light in the remote cavity; and recording images of the interference pattern with the camera as a function of the adjusted optical path length difference, wherein the imaging includes coupling the test light and reference light between the main cavity and the remote cavity with unit magnification.

In general, in another aspect, the invention features a method including: imaging test light reflected from a test surface to interfere with reference light on a camera and form an interference pattern, wherein the test light and reference light are derived from an extended, common source, having a mean wavelength $\lambda$, and including chief rays and marginal rays, and wherein the test light and reference light propagate along different paths in a main cavity including the test surface and at least two remote cavities; adjusting an optical path difference between the test light and reference light in at least one of the remote cavities; and recording images of the interference pattern with the camera as a function of the adjusted optical path length difference in the at least one remote cavity.

In general, in another aspect, the invention features a method including: imaging test light reflected from a test surface to interfere with reference light on a camera and form an interference pattern, wherein the test light and reference light are derived from an extended, common source, and wherein the test light and reference light propagate along different paths in a main cavity including the test surface and at least one remote cavity; and adjusting an optical path difference between the test light and reference light in at least a first of the at least one remote cavity; wherein chief rays for the test and reference light define an optical measurement surface corresponding to a theoretical test surface that would reflect the chief rays of the test light to produce a zero optical path length difference between them and the chief rays of the reference light over the camera, and wherein the imaging includes directing the test light to contact the test surface such that the adjustment of the optical path difference in the first remote cavity adjusts a radius of a locally spherical portion of the optical measurement surface over at least a portion of the test surface.

Embodiments of these second, third, and fourth methods may further include features described above with respect to the first-mentioned method.

In general, in another aspect, the invention features an apparatus including an interferometric imaging system configured to image test light reflected from a test surface to interfere with reference light on a camera and form an interference pattern, the test light and reference light being derived from a common source, having a mean wavelength $\lambda$, and including chief rays and marginal rays. The interferometric imaging system includes: a first set of elements forming a main cavity with the test surface; a second set of elements forming at least one remote cavity, wherein the test light and reference light propagate along different paths in each of the cavities, and a first stage configured to scan an optical path difference between the test light and the reference light in the remote cavities. The interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light. During operation the first stage adjusts the optical path difference $\delta_r$ to vary a total optical path difference between the chief rays at the camera. The interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero.

Embodiments of the apparatus may further include any of the following features.

The at least one remote cavity may include only one remote cavity. Alternatively, the at least one remote cavity may include multiple remote cavities.

The apparatus may further include: the camera; and an electronic controller configured to cause the stage to scan the optical path difference and record images from the camera as a function of the optical path length scan.

The apparatus may further include the common source. For example, the source may be a spatially extended source. For such a source, the main cavity may introduce an optical path difference of at least about $\lambda$ between a marginal ray and a chief ray of test light incident on a common point of the test surface when $\delta_0$=10 mm.

The interferometric imaging system may further include relay optics configured to couple the test light and reference light between the main cavity and the remote cavities, wherein the relay optics provide unit magnification.

The chief rays for the test and reference light may define an optical measurement surface corresponding to a theoretical test surface that would reflect the chief rays of the test light to produce a zero optical path length difference between them and the chief rays of the reference light over the camera, and the first set of elements may be configured to direct the test light to contact the test surface such that the adjustment of the optical path difference scan by the stage scans a position of a locally planar portion of the optical measurement surface over at least a portion of the test surface.

The chief rays for the test and reference light define an optical measurement surface corresponding to a theoretical test surface that would reflect the chief rays of the test light to produce a zero optical path length difference between them and the chief rays of the reference light over the camera, and the first set of elements may be configured to direct the test light to contact the test surface such that the optical path difference scan by the stage scans a radius of a locally spherical portion of the optical measurement surface over at least a portion of the test surface.

The chief rays for the test and reference light may define an optical measurement surface corresponding to a theoretical test surface that would reflect the chief rays of the test light to produce a zero optical path length difference between them and the chief rays of the reference light over the camera, and the apparatus may further include a focus scan stage configured to adjust a position of the camera relative to an image of the optical measurement surface nearest the camera while the first stage adjusts the optical path difference $\delta_r$.

For example, the camera may be mounted on the focus stage, and during operation focus stage may adjust the position of the camera relative to the test surface to maintain the optical measurement surface within a depth of focus of the interferometric imaging system. In another example, the apparatus may further include at least one imaging component mounted on the focus stage, and during operation focus stage may adjust the position of the imaging component relative to the test surface to maintain the optical measurement surface within a depth of focus of the interferometric imaging system.

The second set of elements may form a first remote cavity and a second remote cavity, and the marginal rays in the first remote cavity propagate relative to the chief rays at a first angle, and the marginal rays in the second remote cavity propagate relative to the chief rays at a second angle different from the first angle.

The first set of elements may include a polarizing beam splitter configured to direct the test and reference light along different paths in the main cavity.

The first set of elements may include a non-polarizing beam splitter configured to direct the test and reference light along different paths in the main cavity.

The interferometric imaging system may include any of a Linnik interferometer, a Michelson interferometer, and a Mirau interferometer.

In general, in another aspect, the invention may further include an apparatus including an interferometric imaging system configured to image test light reflected from a test surface to interfere with reference light on a camera and form an interference pattern, the test light and reference light being derived from an extended, common source. During operation the interferometric imaging system defines a main cavity including the test surface and at least one remote cavity, and is configured to direct the test light and reference light to propagate along different paths in each of the main cavity and the at least one remote cavity. The interferometric imaging system includes: a stage configured to scan an optical path length difference between the test light and the reference light in a first of the at least one remote cavity, a first detachable, optical assembly configured to form the main cavity with the test surface when the test surface includes a locally planar region and when attached to the remainder of the inteferometric imaging system; and a second detachable, optical assembly configured to form the main cavity with the test surface when test surface includes a locally spherical region and when attached to the remainder of the inteferometric imaging system.

This apparatus may further include features described above with respect to the first mentioned apparatus.

Embodiments of the invention can provide one or more of the following advantages.

Use of coupled cavities can improve the versatility of a tool by allowing interchangeable configurations of the main cavity to be switched depending on the specific application. Accordingly, a tool can be used for profiling different surface types (e.g., planar, spherical, or conical) without substantial reconfiguration. This can also provide a cost savings to the user who would otherwise purchase a different tool for each application. Use of coupled cavities also allows the main cavity (i.e., the cavity adjacent the test surface) to be a fixed cavity, which can reduce the bulk of components that need to be accommodated close to the measurement surface. Scanning using a remote cavity can allow the test part to remain fixed relative to the tool, reducing a measurement's susceptibility to vibrations.

Use of a spatially extended source can provide higher intensity illumination than a point source, and can allow a user to select from a greater variety of potential sources.

As used herein, the temporal coherence length of a source point for a band-limited spectrum of width $D_1$ (full-width at half maximum) and centered at a mean wavelength $\lambda_0$ is $\lambda_0^2/D_1$.

As used herein, the spatial coherence length of an extended monochromatic or quasi-monochromatic source is: $4\lambda/NA^2$, for an interferometer where the source fills the pupil of a collimating objective of numerical aperture NA. A filled pupil means that if F is the focal length of the microscope objective then the source size at the pupil is at least 2 F NA. If the source is smaller than the pupil then the spatial coherence of an extended monochromatic or quasi-monochromatic source is: $16\lambda\ F^2/D^2$ where D is the source diameter.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In surface profiling interferometry, it is sometimes desirable to perform a controlled optical path difference (OPD) variation with a rigid and immobile two-beam interferometer assembly or cavity. For example, where the test surface is located on a part that cannot easily be positioned relative to a bulky optical assembly, it may be desirable to use an immobile interferometer assembly which can be more compact (e.g., because none of the interferometer components need to be mounted on movable stages). To vary the OPD for a fixed interferometer assembly, one can translate the test surface relative to a location at which the test surface reflects measurement wavefronts that have a zero OPD with respect to reference wavefronts. This location corresponds to a theoretical test surface that would reflect the measurement wavefront to produce a constant optical path length difference between the measurement and reference wavefronts, and is referred to herein as the "optical measurement surface" of the interferometer. When translating the test part, the optical measurement surface effectively remains stationary while the part moves through it.

Alternatively, to vary the OPD, one can utilize a secondary, remote cavity that is coupled to the main cavity creating a tandem or coupled cavity configuration. One of the surfaces in the remote cavity can be mounted on a movable stage. Moving this surface with the stage then introduces a net OPD variation between the measurement and reference wavefronts exiting the coupled cavities, produce an analogous effect to moving a reference surface or the test surface in the main cavity. Put another way, the test part remains fixed, while the optical measurement surface moves over it.

However, when using an extended light source in a coupled cavity system, spatial coherence is not guaranteed. Each portion of the extended source can be thought of as a separate point source, wherein each point source gives rise to a different interferogram at the detector. Marginal rays from an extended source imaged to a detector via a test surface can have different incident angle at the test surface relative to chief rays. In the event that the optical path length of rays contributing to different interferograms of the same portion of the test surface are different, the interference fringes of the different interferograms will not be in phase and will wash each other out. The result will be reduced contrast of the interference fringes at the detector.

Figure 1A:
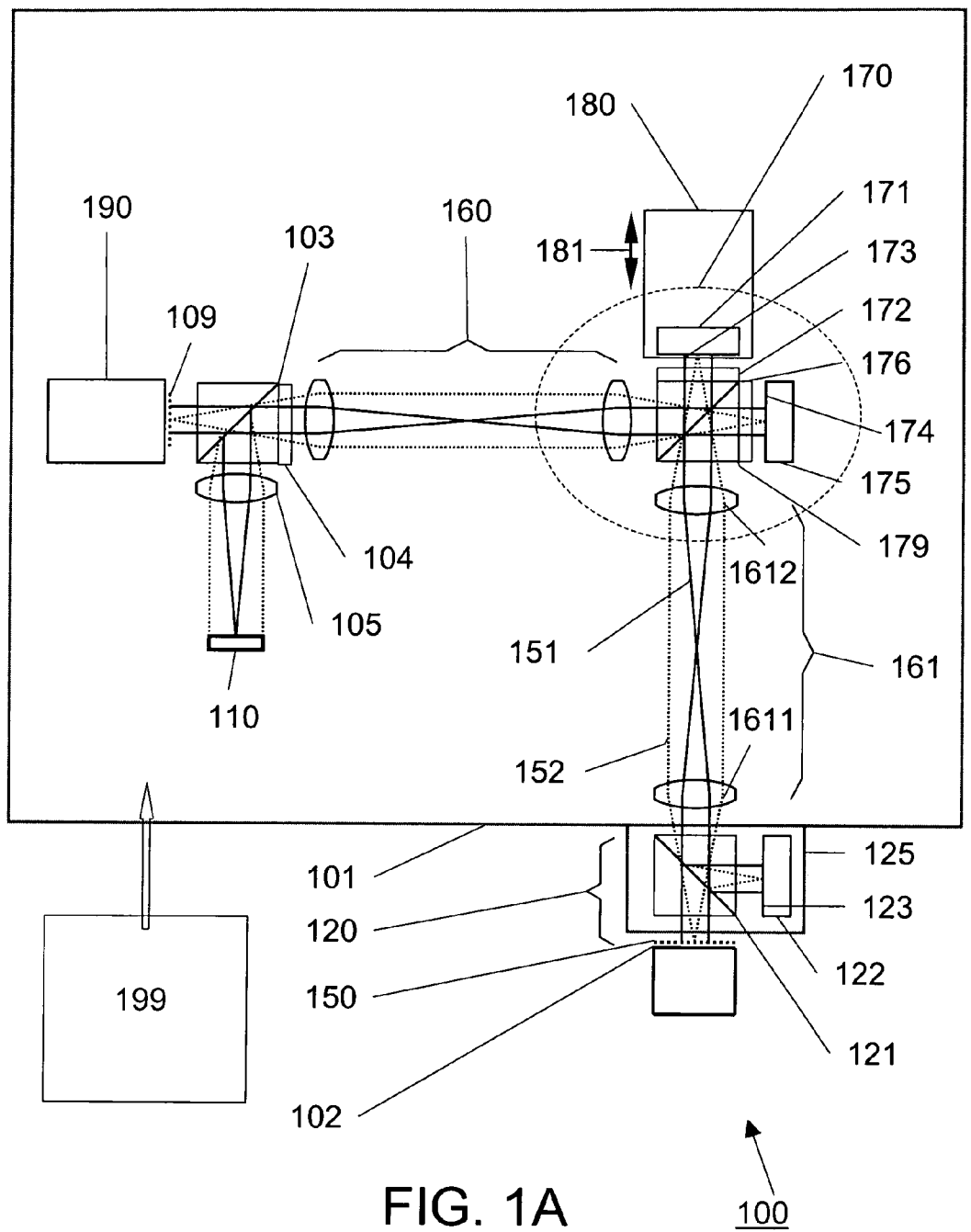
FIG. 1A is a schematic view of an embodiment of an interferometry system including coupled cavities and an extended light source.

Referring to FIG. 1A, an interferometry system 100 is configured to profile nominally flat part surface 102, and includes a main cavity 120 linked to a remote cavity 170 via a set of telecentric, 1:1 relay optics 161. Illumination from an extended light source 110, collimated by an illuminator lens 105, is polarized and redirected by a polarizing beam splitter (PBS) 103. Light source 110 can be a light-emitting diode, a halogen bulb, or other source having the characteristic of multiple source points spread over an area larger than the few-micron type emission areas characteristic of point sources such as laser diodes. A half-wave plate 104 adjusts the polarization angle to 45° with respect to the plane of the figure. A set of imaging optics 160 transmits the illumination to a PBS 179 in remote cavity 170. PBS 179 splits and redirects the illumination into a measurement beam impinging on a remote measurement mirror 171 and a reference beam impinging on a remote reference mirror 175. The reference and measurement beams are initially mutually orthogonal, linearly polarized beams as they exit PBS 179, but become mutually orthogonal, circularly polarized beams after passing through quarter wave plates 176 and 172, respectively. After reflection and retransmission through quarter wave plates 176 and 172, the once-again linearly polarized reference and measurement beams recombine in PBS 179 and propagate downward in the figure through relay optics 161 to main cavity 120, where a PBS 121 again directionally separates the reference and measurement beams, this time according to their polarization states. The measurement beam reflects from test surface 102 and the reference beam reflects from a local reference mirror 122. After recombination in PBS 121, the reference and measurement beams propagate now upwards through relay optics 161, separate and recombine once more in remote cavity 170, and then proceed through imaging optics 160 eventually focusing to an image 109 on a camera 190.

Figure 3:
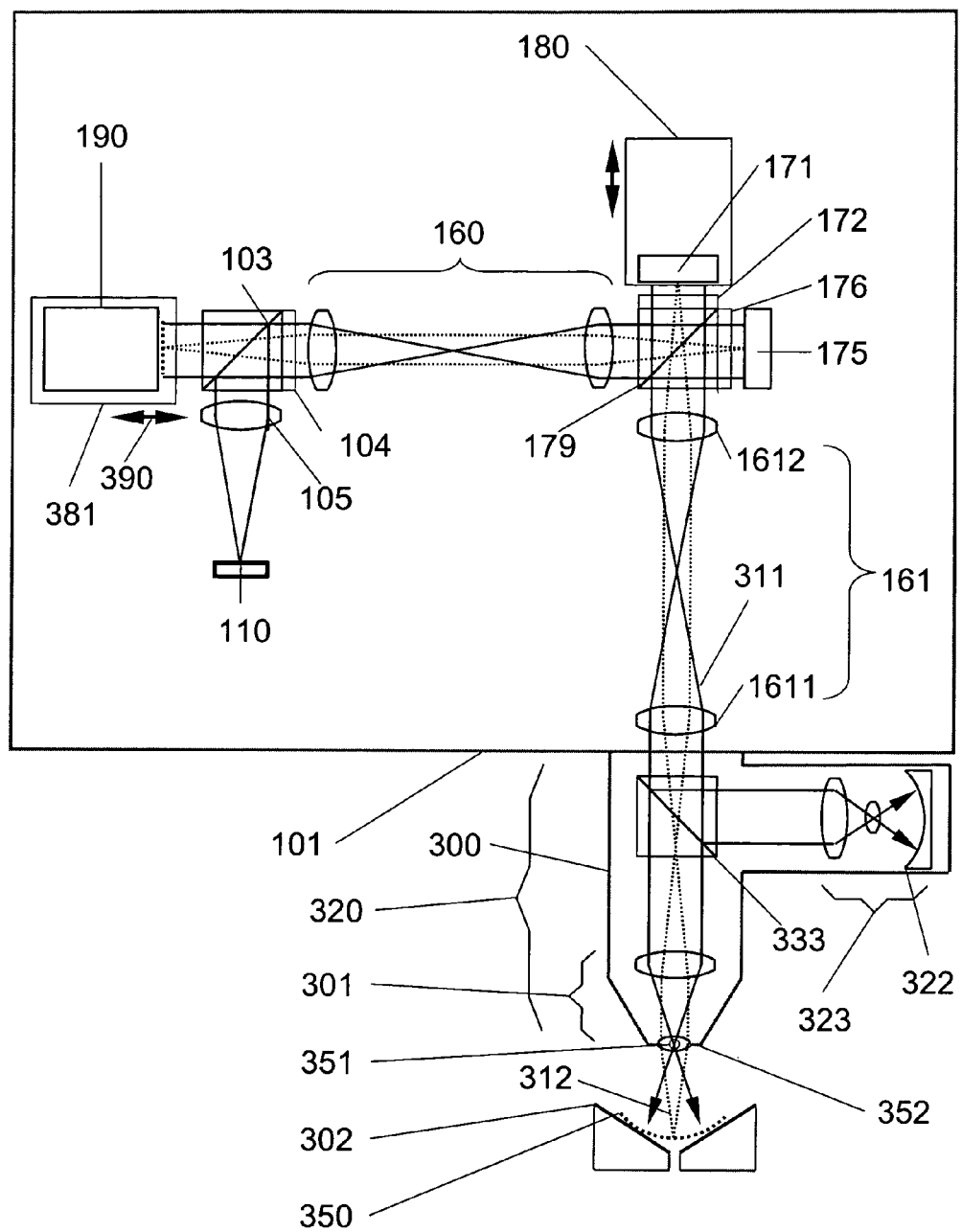
FIG. 3 is a schematic diagram of the interferometry system shown in FIG. 1A with an alternative main cavity configuration.

Main cavity 120 is housed in an enclosure 125 that is separated from another enclosure 101 housing the balance of the system components. This mechanical separation makes it possible to remove and replace main cavity 120 as desired, for example to introduce an alternative optical configuration for main cavity 120 without changing the rest of the system. An alternative optical configuration is described in a subsequent embodiment (see FIG. 3).

In the present configuration, which is a nominal case, both a surface 123 of reference mirror 122 and test surface 102 are imaged via relay optics 161 to a surface 173 of remote measurement mirror 171 and surface 174 of remote reference mirror 175, respectively. These intermediate images are then both reimaged to image 109 on camera 190. Accordingly, the optical path length of each ray of the measurement beam from part surface 102 to camera 190 is equal, as is each ray of the reference beam. Furthermore, for the nominal case shown, remote measurement mirror 171 and remote reference mirror 175 are positioned relative to PBS 179 such that remote cavity 170 introduces zero OPD. A theoretical surface corresponding to a surface that would reflect the chief rays of the measurement beam to produce a zero OPD between it and the chief rays of the reference beam over the camera is indicated as an optical measurement surface 150. Where remote cavity 170 introduces zero OPD, optical measurement surface 150 coincides with the focal plane of the system, which is nominally the position of test surface 102 as shown in FIG. 1A.

However, during operation, the system scans optical measurement surface 150 relative to test surface 102. Furthermore, in some cases, test surface 102 may not be positioned exactly coincident with optical measurement surface 150, requiring the system to reposition optical measurement surface 150 relative to the test surface. To accomplish this, an OPD scan stage 180 adjusts the effective position of optical measurement surface 150 by translating remote measurement mirror 171 towards and/or away from PBS 179, as indicated by arrows 181. This causes remote interferometer 170 to introduce a non-zero OPD to offset, and therefore compensate, the now non-zero OPD introduced by main cavity 120.

To accommodate spatially extended light source 110, interferometry system 100 is arranged so that remote cavity 170 and main cavity 120 have comparable optical characteristics for a wide range of marginal rays, e.g., marginal ray 152 shown in FIG. 1A. Specifically, the OPD will remain unchanged for all marginal rays regardless of position of remote measurement mirror 171, at least over some limited range. Likewise, the OPD for all chief rays, e.g., chief ray 151, will remain unchanged.

Figure 1B:
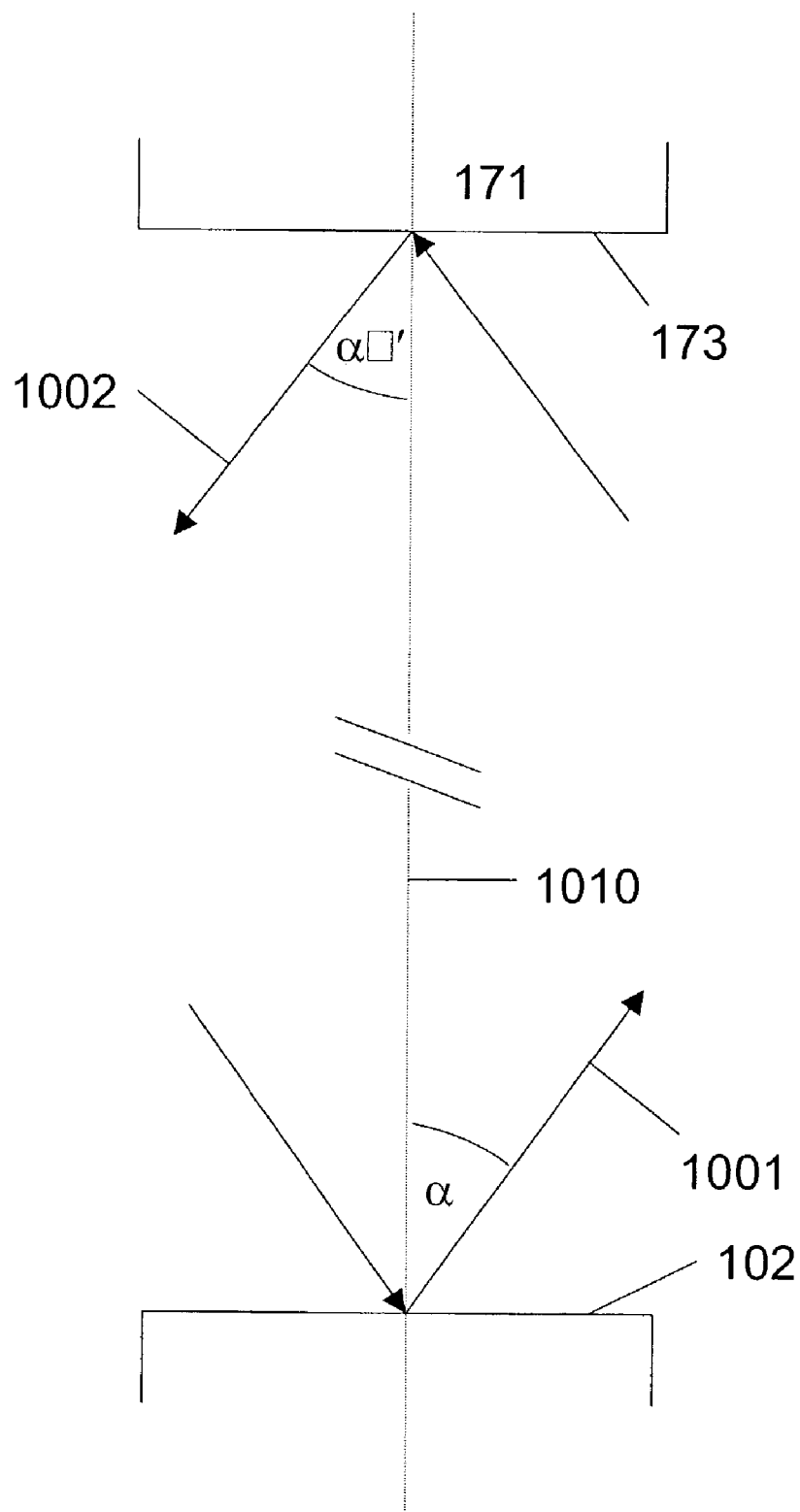
FIG. 1B is a schematic diagram showing ray paths within the coupled cavities of the interferometry system of FIG. 1A.

To provide comparable optical characteristics for a wide range of marginal rays, the numerical aperture (NA) of remote cavity 170 and main cavity 120 is matched. In the present embodiment, this can be achieved by the appropriate choice of relay optics 161 which include lenses 1611 and 1612. Before the operation of interferometry system 100 is further described, the concept of matching cavity NA's is elaborated. Due to the extended light source, system 101 illuminates each point on test surface 102 with rays propagating in a plurality of different directions within a cone defined by the optical characteristics of the main cavity. Referring to FIG. 1B, a non-normal ray (e.g., a non chief ray) is reflected from test surface 102 at an angle α with respect to an optical axis 1010, which is normal to surface 173. In the remote cavity, the corresponding ray is reflected from surface 173 at an angle α' with respect to optical axis 1010. The ratio of these angles is defined by a scaling factor, s, as $$s = \frac{\alpha'}{\alpha}. \quad (1)$$

Note that where the remote cavity and main cavity have matched optical characteristics (i.e., matched NA's), s=1. In addition, s is the inverse magnification of the optical system that creates the image in the remote cavity. So matching NA's, in the present embodiment, corresponds to having a one-to-one relay between the main and remote cavities.

Defining $\delta_0$ as the OPD introduced between reference and measurement beam chief rays by the main cavity and $\alpha_m$ as the maximum ray angle in object space (i.e., the marginal ray angle in the main cavity), the object NA, or NA of main cavity 120, is then defined as n sin($\alpha_m$), where n is the refractive index of the medium.

Figure 1C:
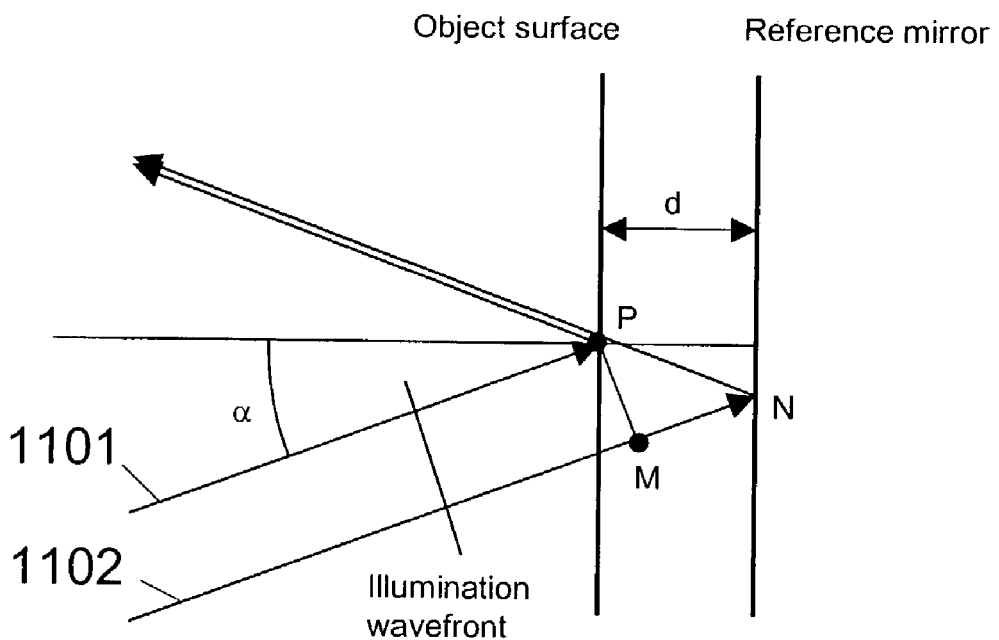
FIGS. 1C and 1D are schematic diagrams showing the optical path difference (OPD) for measurement and reference illumination introduced by the main cavity of the interferometry system of FIG. 1A.
Figure 1D:
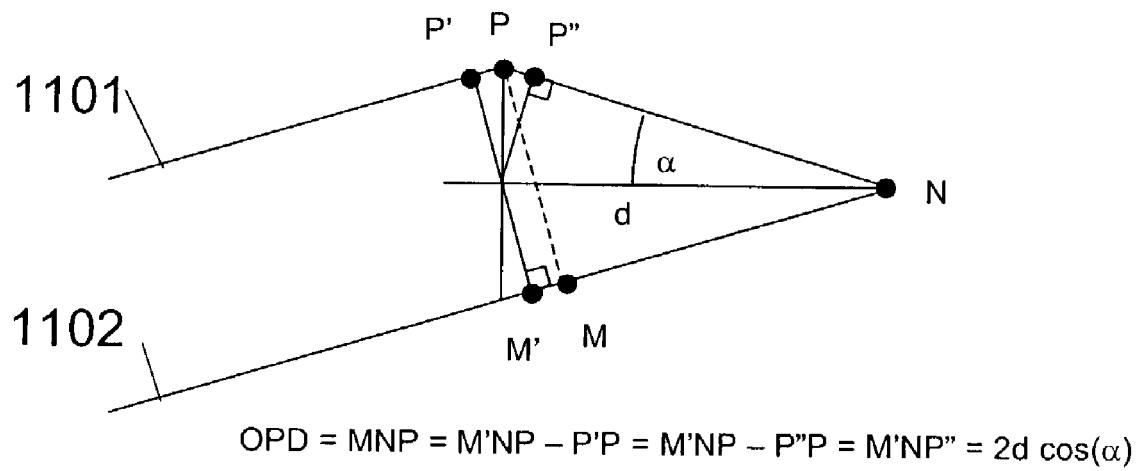

Referring now to FIGS. 1C and 1D, the overlap of the object and reference paths for an offset of test surface 102 from optical measurement surface 150 in main cavity 120 in FIG. 1A. Point P on test surface 102 is the point imaged on the camera. Rays 1101 and 1102 come from the same source point, which appears to be located at infinity. The OPD between a ray in the measurement beam and a corresponding ray in the reference beam is the difference between the optical path length of the reference beam ray and the measurement beam ray. For a test surface displacement d the on-axis optical path difference is simply $\delta_0$=2d. However, for the off-axis rays the OPD is given by $\delta_0 \cos(\alpha)$ (the extra optical path is MNP, as shown in FIG. 1D).

Thus, for main cavity 120, the OPD, referred to as $OPD_m$, is given by $$OPD_m(\alpha) = \delta_0 \cos(\alpha). \quad (2)$$

Note that for a point source, α=0 for all rays (i.e., all rays are chief rays) and $OPD_m = \delta_0$. For an extended source, however, the main cavity introduces a non-zero OPD between chief rays and marginal rays equal to $\delta_0(1-\cos(\alpha_m))$. In some embodiments, for $\delta_0$=10 mm, an extended source introduces an OPD between chief rays and marginal rays equal to at least about λ (e.g., at least about 3λ, such as 5λ or more), where λ is the mean wavelength of the source.

Similar to the main cavity, for a displacement d' of remote measurement mirror 171, the OPD introduced by a single pass of the light through the remote cavity, referred to as $OPD_r$, is given by $$OPD_r(\alpha) = \delta' \cos(s\alpha), \quad (3)$$

where δ' is the OPD introduced between measurement and reference beam chief rays and δ'=2d', where d' is a displacement between the remote measurement surface and the remote reference surface similar to d indicated in FIG. 1C.

The net OPD as a function of angle for the entire interferometer is then:

$$OPD_{total}(\alpha) = OPD_m(\alpha) + OPD_r(\alpha) = \delta_0 \cos(\alpha) + 2\delta' \cos(s\alpha), \quad (4)$$

where the additional factor of 2 in the contribution from remote cavity 170 is due to the light passing twice through this cavity.

Thus, when $$d' = -\frac{1}{2}d$$

the OPD introduced to on-axis light by the remote cavity matches the main cavity on-axis OPD, and Equation 4 reduces to:

$$OPD_{total}(\alpha) = \delta_0(\cos(\alpha) - \cos(s\alpha)). \quad (5)$$

Accordingly, where $$s = 1 \text{ and } \delta' = -\frac{1}{2}\delta_0,$$

$OPD_{total}$=0 for all ray angles α. In other words, for the present embodiment, where the optical characteristics of the main and remote cavities are matched, it is possible to adjust the location of optical measurement surface 150 while maintaining the optical measurement surface in focus by translating remote measurement mirror 171 by half the amount of the displacement of test surface 102 from the original optical measurement surface. Note that in the present embodiment, the location of image 109 does not change as a function of the location of the test surface.

Where s≠1, the dependence of $OPD_{total}$ on ray angle will result in a fringe contrast loss since different source points create interferograms that are out of phase. This can be quantified by performing a Taylor expansion of the cosines in Equation 5, $OPD_{total}$ can be expressed as $$OPD_{total}(\alpha) = \delta_0\left(1 - \frac{\alpha^2}{2} - 1 + \frac{s^2\alpha^2}{2}\right), \quad (6)$$

which reduces to $$OPD_{total}(\alpha) = \delta_0 \frac{\alpha^2}{2}(s^2 - 1). \quad (7)$$

One can derive a rule of thumb to estimate the value of s needed to achieve a certain minimum fringe contrast in the interferometer. For a uniform illumination source (i.e., where each source point has the same brightness) having a spectral distribution S(k), where k=2π/λ, the interference intensity at the detector takes the form:

$$I(\delta') = \left(\int_{k_1}^{k_2}\int_0^{\alpha_m} S(k)2\pi\alpha d\alpha dk\right)^{-1} \quad (8)$$

$$\int_{k_1}^{k_2}\int_0^{\alpha_m} S(k)(1 + \cos(k(\delta_0\cos(\alpha) + 2\delta'\cos(s\alpha))))2\pi\alpha d\alpha dk$$

This equation describes the intensity recorded at the detector as a function of the remote cavity chief ray OPD δ'. By using again a third order Taylor expansion of cos(α), Equation 9 can be simplified in the form:

$$I(\delta') = 1 + \left(\int_{k_1}^{k_2} S(k)dk\right)^{-1}\int_{k_1}^{k_2} S(k)\operatorname{sinc}\left(\frac{1}{4}k\alpha_m^2(\delta_0 + 2\delta's^2)\right) \quad (9)$$

$$\cos\left(k(\delta_0 + 2\delta') + \frac{1}{4}k\alpha_m^2(\delta_0 + 2\delta's^2)\right)dk$$

If the source spectral width is reasonably small, variations of the sinc function in the integral with k can be ignored, and this integral can be approximated by its value calculated at mean angular wavenumber 2π/λ₀, corresponding to $k_0$. This yields the following approximation:

$$I(\delta') = 1 + \left(\int_{k_1}^{k_2} S(k)dk\right)^{-1}\operatorname{sinc}\left(\frac{1}{4}k_0\alpha_m^2(\delta_0 + 2\delta's^2)\right) \quad (10)$$

$$\int_{k_1}^{k_2} S(k)\cos\left(k(\delta_0 + 2\delta') + \frac{1}{4}k\alpha_m^2(\delta_0 + 2\delta's^2)\right)dk$$

During a scan of the remote cavity OPD the maximum fringe contrast will be obtained when $$\delta' = -\frac{1}{2}\delta_0.$$

This fringe contrast is limited by the sinc function of Equation 10:

$$V = \operatorname{sinc}\left(\frac{1}{4}\frac{2\pi}{\lambda}\delta_0\alpha_m^2(1 - s^2)\right). \quad (11)$$

By selecting an appropriate minimum value for the maximum fringe contrast, a bounding range for s can be determined. In general, the minimum value for the maximum fringe contrast is determined based on, e.g., the sensitivity of the detector and the algorithm used to analyze the interference data. In some embodiments, the minimum value for the maximum fringe contrast can be about 50% or more (e.g., about 60% or more, such as 75% or more). Equation 11 can be used to determine a range for s for a particular minimum value for the maximum fringe contrast. For example, for a minimum value for the maximum fringe contrast of at least about 50%, the optical characteristics of the main and remote cavities should be selected so that s falls within the range given by $$1 - 1.2\frac{\lambda}{\delta_0\alpha_m^2} < s^2 < 1 + 1.2\frac{\lambda}{\delta_0\alpha_m^2}. \quad (12)$$

where λ is the mean wavelength of the light source and $s^2>0$.

Note that where $\delta_0=0$, which occurs where the main cavity introduces zero OPD to the net OPD, then Equation 12 reduces to $0<s^2<+\infty$. In other words, for this configuration, the optical characteristics of the main cavity and remote cavity do not have to be matched because any value of s provides fringe contrast greater than 50%. A similar result is achieved for cases where $\alpha_m$ is very small (e.g., where light source 110 is a point source). However, as $\delta_0$ and $\alpha_m$ grow (e.g., for cases where test surface 102 is positioned so that the main interferometer introduces a non-zero OPD and/or where an extended light source is used) the bounds in Equation 12 tend toward one, which imposes a scale factor, s, very close to one in order to achieve a desirable fringe contrast. This corresponds to one-to-one imaging between object space and remote cavity space.

Referring again to FIG. 1A, once optical measurement surface 150 is nominally coincident with test surface 102, the system scans the optical measurement surface through the test surface. A computer 199 in communication with camera 190 and OPD scan stage 180 acquires data from camera 190 as a function of the location of optical measurement surface 150, thereby providing interference intensity data for analysis of the topography of part surface 102.

Figure 2:
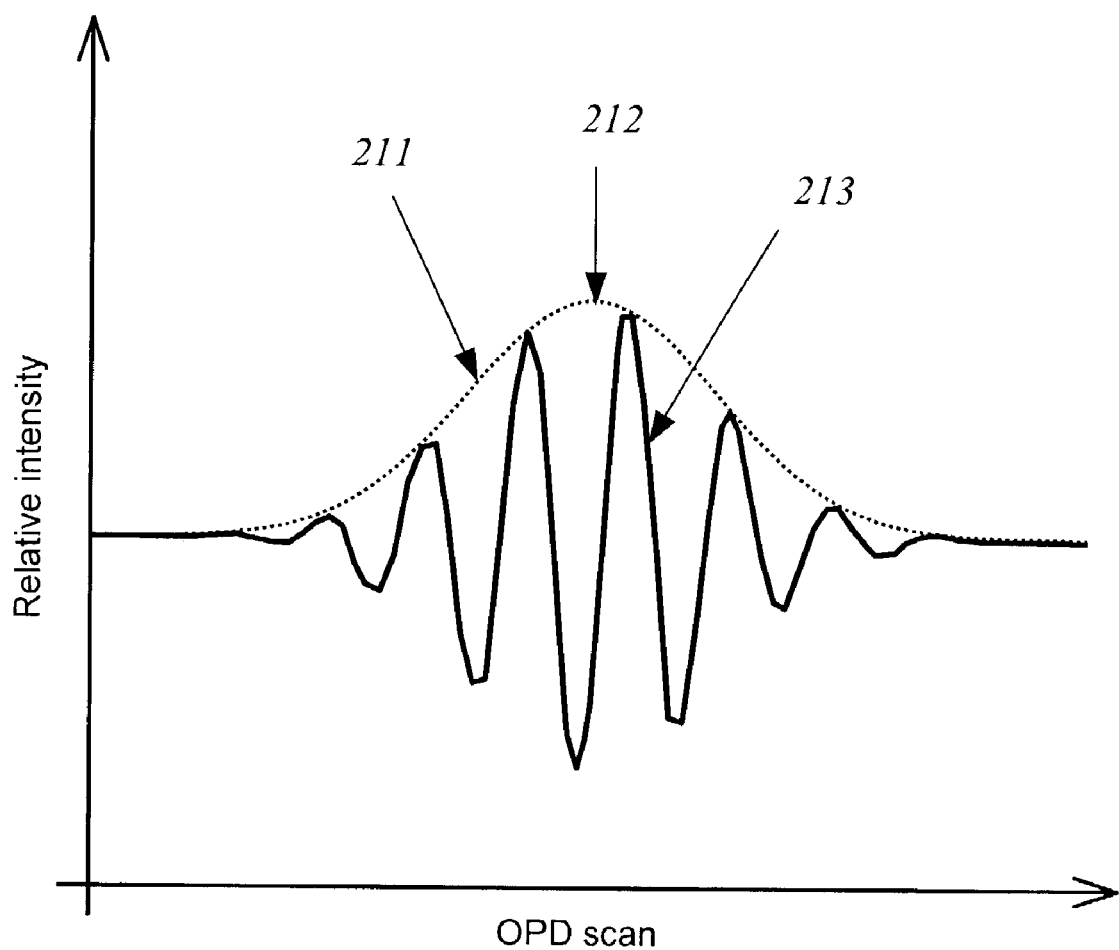
FIG. 2 is a plot showing the relative intensity detected for a single pixel as a function of OPD.

An example data set for a single pixel of camera 190 is shown in FIG. 2. The localization of an interference intensity signal 213 around the zero optical-path difference (OPD) position is characteristic of interferometry assuming that the source is spectrally broadband, e.g., a spectral bandwidth, $D_1$, of 100 nm centered at, e.g., 600 nm. The fringe localization provides a means of determining the precise moment when the measurement plane intersects the object point corresponding to the image pixel. Computer 199 precisely controls the scan motion, so that knowledge of when a given object point is at zero OPD can be directly translated into a relative length, e.g., of chief ray 151 (see FIG. 1A). For example, suppose interference data for a first pixel looks as in FIG. 2, with a peak 212 in the fringe contrast 211 at a scan position of 0 μm. A second pixel for camera 190 might have a different fringe contrast peak at a different scan position, for example 10 μm. The difference in position of the contrast peaks between the two object points corresponding to these image pixels would therefore be 10 μm. One may apply any of a variety of techniques for determining surface height using low-coherence sources. Data processing involves, for example, coherence envelope detection described by T. Dresel and co-workers in "Three-dimensional sensing of rough surfaces by coherence radar," *Appl. Opt.* 31 (7), pp. 919–925 (1992), or frequency domain analysis described in U.S. Pat. No. 5,398,113, entitled "METHOD AND APPARATUS FOR SURFACE TOPOGRAPHY MEASUREMENT BY SPATIAL-FREQUENCY ANALYSIS OF INTERFEROGRAMS," to Peter de Groot. The entire contents of both of these references are hereby incorporated by reference.

As discussed previously, one advantage of having a fixed main cavity in a separate housing from a remote cavity and detector is that the main cavity can be changed according to the test surface to be measured, but the rest of the components can be left unchanged. This provides increased tool flexibility to the user without a substantial increase in cost. For example, referring to FIG. 3, in some embodiments main cavity 120 can be replaced with a different main cavity 320 designed for measuring a conical part surface 302. In main cavity 320, a set of measurement optics 301 are arranged to generate a spherical measurement surface 350 for measuring conical part surface 302. Measurement optics 301, together with a set of dispersion-matched reference optics 323, a PBS 333, and a spherical reference mirror 322, form main cavity 320 which is housed in an enclosure 300 detachable from enclosure 101.

The chief rays of the system (e.g., chief ray 311) pass through a common datum point 351 located within a physical aperture stop 352. The marginal rays of the system (e.g., marginal ray 312) from the on axis portion of the test surface, go to the rim or margin of aperture stop 352. Datum point 351 defines a point of reference for the geometric interpretation of the surface profile information gathered during data acquisition. Cavities similar to main cavity 320 and techniques for analyzing data acquired from such cavities are described in U.S. patent application Ser. No. 10/190, 353, entitled "MEASUREMENT OF COMPLEX SURFACE SHAPES USING A SPHERICAL WAVEFRONT," to Peter de Groot and co-workers, and filed Jul. 3, 2002, the entire contents of which are hereby incorporated by reference in their entirety.

The optical geometry of main cavity 320 has continuously variable magnification with test surface position, unlike the telecentric arrangement shown in FIG. 1A for which the magnification is to first order independent of test surface position. Accordingly, the optical characteristics of main cavity 320 are only perfectly matched to the optical characteristics of remote cavity 170 for one position where the magnification of the optical system is one. Fringe contrast can degrade for other positions.

To first order (e.g., for small $\alpha_m$ and/or small d), the OPD introduced by main cavity 320, $OPD_m$, can still be accurately expressed by Equation (4). However, because magnification changes (i.e., s in Equation (4)) as a function of the radius of curvature of optical measurement surface 350, s varies as a function of $\delta_0$ and is only equal to one for one value of $\delta_0$.

Although NA's are only matched where s=1, according to Equation (4), OPD's can also be matched for all rays where $\delta_0=\delta'=0$. Thus, main cavity 320 can be designed based on these parameters to provide a range of $OPD_m$'s where $\delta_0 \approx \delta' \approx 0$ and/or s≈1 and fringe contrast remains high. The position at which $\delta_0=\delta'=0$ depends on, for example, the radius of curvature and location of reference mirror 322. s depends on the optical components in the imaging system, such as measurement optics 301 and relay optics 161. One can select components so that reduced fringe contrast due to an increasing $\delta_0$ is compensated (at least to some extent) by s tending to one, and vice-versa. Thus, careful selection of the components based on the principals disclosed herein can increase the operational range of the sensor.

When using main cavity 320, a linear relationship between chief ray angles at the object surface with respect to chief ray positions on camera 190 can be preserved, rather than preserve magnification. However, in that measurement optics 301 are non-telecentric and have variable magnification, camera 190 should mounted on a motion of a focus scan stage 381 to accommodate more precisely the changing position of best focus independently from OPD scan stage 180. Focus scan stage 381 translates camera 190 in the direction of arrows 390 Techniques for accommodating the changing position of best focus are described in U.S. patent application Ser. No. 10/464,723, entitled "iNTERFEROMETRIC OPTICAL SYSTEMS HAVING SIMULTANEOUSLY SCANNED OPTICAL PATH LENGTH AND FOCUS," filed Jun. 17, 2003, which claims priority to Provisional Patent Application 60/389,762, also entitled "INTERFEROMETRIC OPTICAL SYSTEMS HAVING SIMULTANEOUSLY SCANNED OPTICAL PATH LENGTH AND FOCUS," filed Jun. 17, 2002. The entire contents of both of these references are hereby incorporated by reference.

Some embodiments can have additional components housed in enclosure 300 rather than enclosure 101, and vice-versa. For example, although lens 1611 in relay optics 161 is housed in enclosure 101, it could be included in enclosure 300. Accordingly, a different relay optic could be included with different main cavity configurations, providing an additional degree of freedom for optimizing the optical characteristics of the main and remote cavities. More generally, although the described embodiment refers to specific optical configurations and components, in other embodiments alternative or additional components and configurations can be used.

Figure 4:
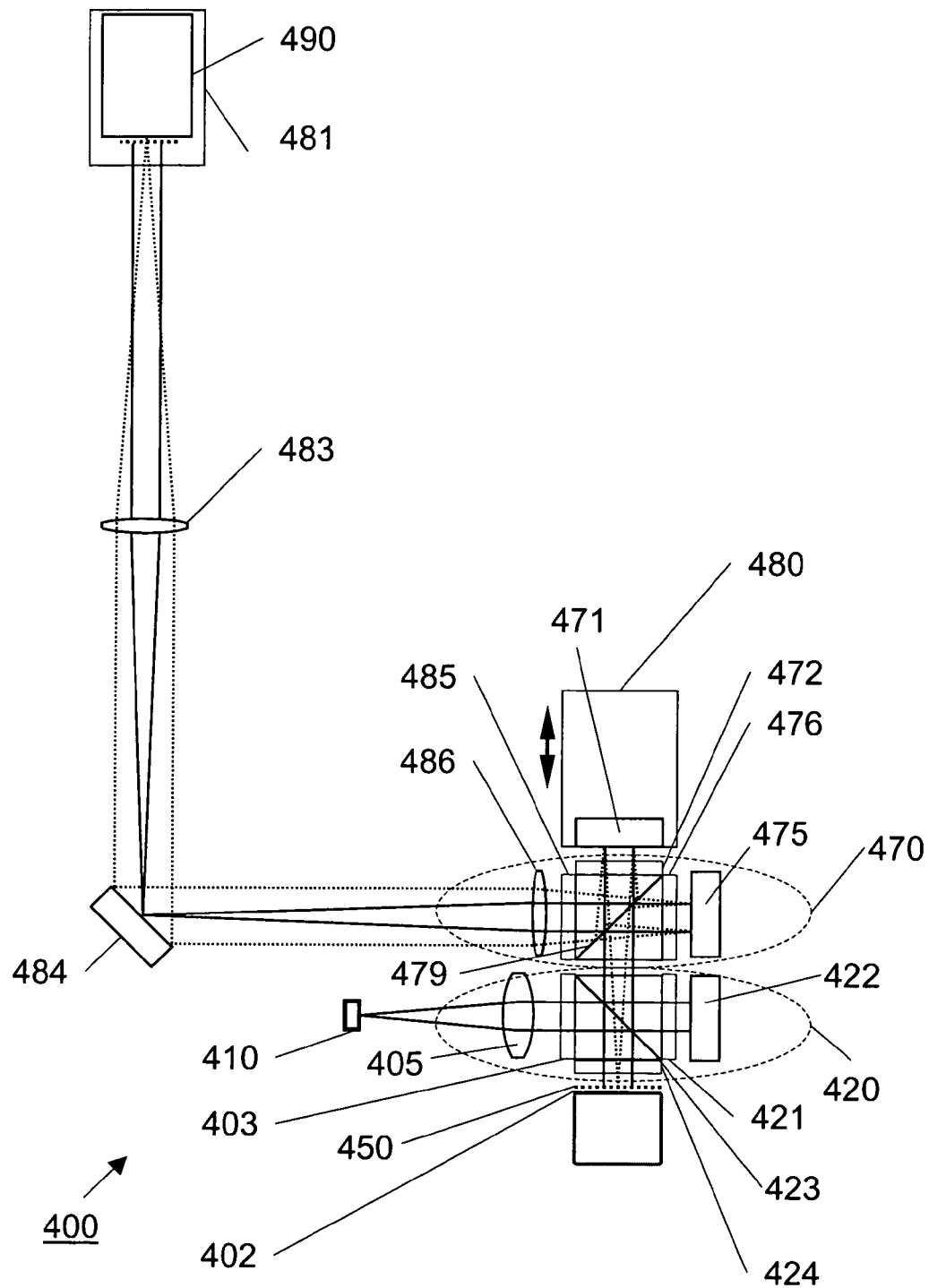
FIG. 4 is a schematic diagram of an interferometry system with a different coupling between the main and remote cavities different from the coupling of the interferometry system shown in FIG. 1A.

For example, in the foregoing embodiments, the optical characteristics of the main and remote cavities are determined in part by relay optics 161. Other embodiments do not require such optics. FIG. 4, for example, shows an interferometry system 400 for measuring a part surface 402 in which there are no relay optics between a main cavity 420 and a remote cavity 470. In other words, system 400 directly couples light between the main cavity and the remote cavity without using any element having optical power. Main cavity 420 and remote cavity 470 are included together in the focused beam path of a common objective lens 486. The common objective lens automatically assures a common NA and matched optical properties with OPD variations (i.e., for translations of optical measurement surface 450). Additional features include an extended light source 410 providing illumination directly to main cavity 420 after transmission through an illuminator lens 405 and a 45° polarizer 403. Main cavity 420 includes PBS 423 and reference mirror 422. Remote cavity 470 includes PBS 479, remote measurement mirror 471, and remote reference mirror 475. This arrangement also benefits from a focus scan stage 481 via an imaging lens operating independently of an OPD scan stage 480 so as to maintain proper focus. A polarizer 485 mixes the polarized reference and measurement beams, while a fold mirror 484 redirects the light to a camera 490 on focus scan stage 481. Quarter wave plates 424 and 421 are provided in the measurement beam and reference beam legs of the main cavity to transform the polarization state of the respective beams on their incoming to outgoing legs. Similarly, quarter wave plates 472 and 476 are provided in remote cavity 470.

The foregoing embodiments all maintain separate paths between the reference and measurement beams by means of polarization encoding. Alternatively, or additionally, the measurement and reference paths may be separated by coherence multiplexing. Coherence multiplexing refers to arrangements in which the relative placement of the main and remote reference mirrors and the remote measurement mirror is such that the only optical paths in the system that have an OPD less than the temporal coherence length of the source correspond to the optical path of the reference and measurement beams. In other words, wavefronts that experience multiple reflections within the remote and/or main cavity do not contribute to the interference fringes at the camera, and thus do not degrade the fringe contrast.

Figure 5:
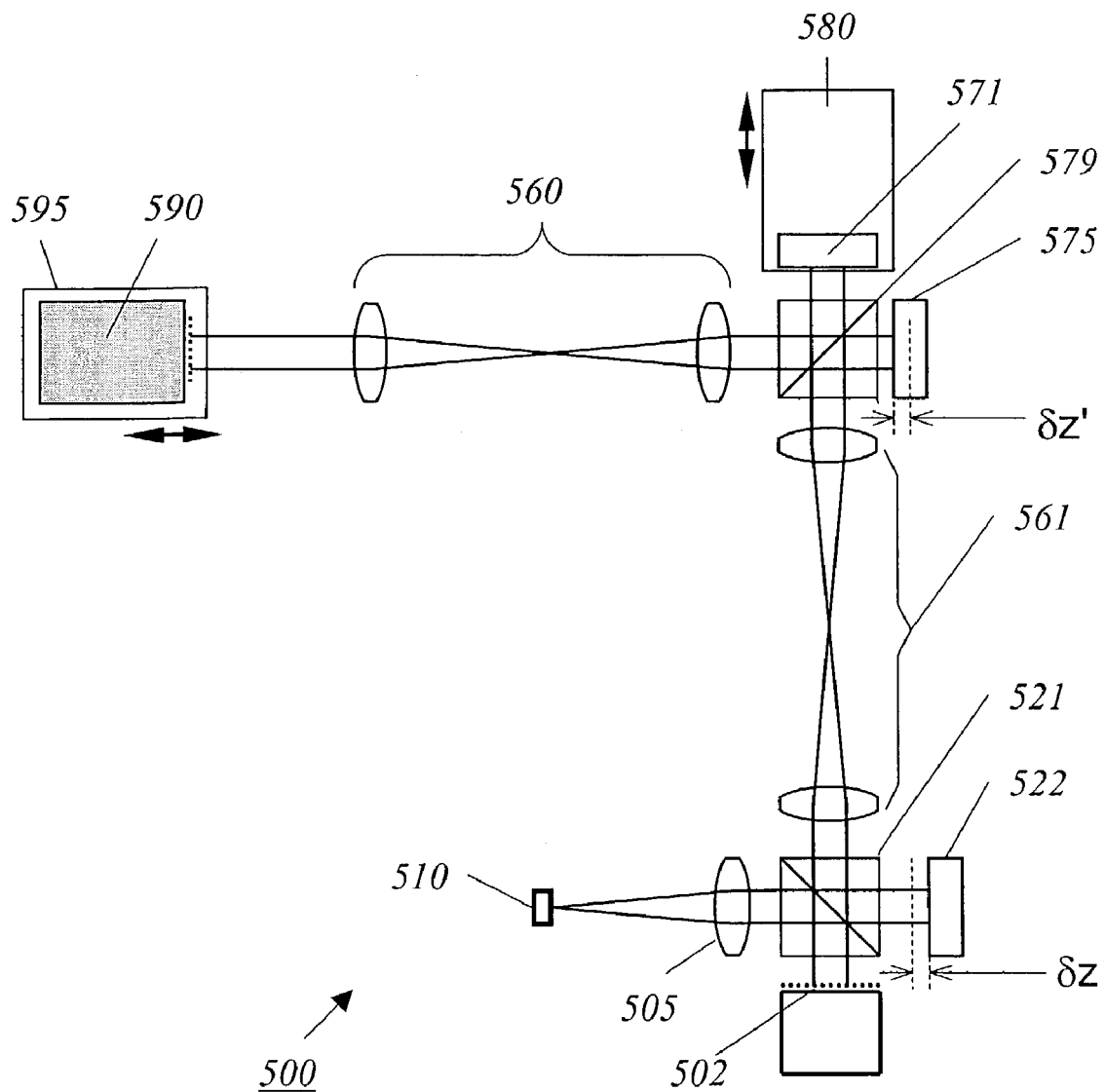
FIG. 5 is a schematic diagram of an interferometry system including coupled cavities that utilizes coherence multiplexing.

Referring to FIG. 5, an example of an interferometry system that utilizes coherence multiplexing is system 500 configured to perform surface profiling measurements of a test surface 502. System 500 includes an extended light source 510 that is selected to have a small temporal coherence length (e.g., less than about 1 mm, such as less than about 100 μm), meaning that interference takes place only over a small range of OPD values. As illustrated in FIG. 5, a small offset δz of a main reference mirror 522 is compensated by an offset δz' of a remote reference mirror 575 in a direction that maintains zero net OPD overall. However, offsets δz and δz' are larger than the temporal coherence length of light source 510, thus substantially preventing unwanted interference between the measurement and reference paths even without polarization encoding during transmission through a set of relay optics 561. Note that in system 500, separation and combination of the measurement and reference beams may be accomplished with a main non-polarizing beam splitter (NPBS) 521 and a remote NPBS 579, thus simplifying the optical system. Additional components in system 500 include an illuminator lens 505, a remote measurement mirror 571, imaging optics 560, and a camera 590. Remote measurement mirror 571 and camera 590 are mounted on an OPD scan stage 580 and a focus scan stage 595, respectively.

Figure 6:
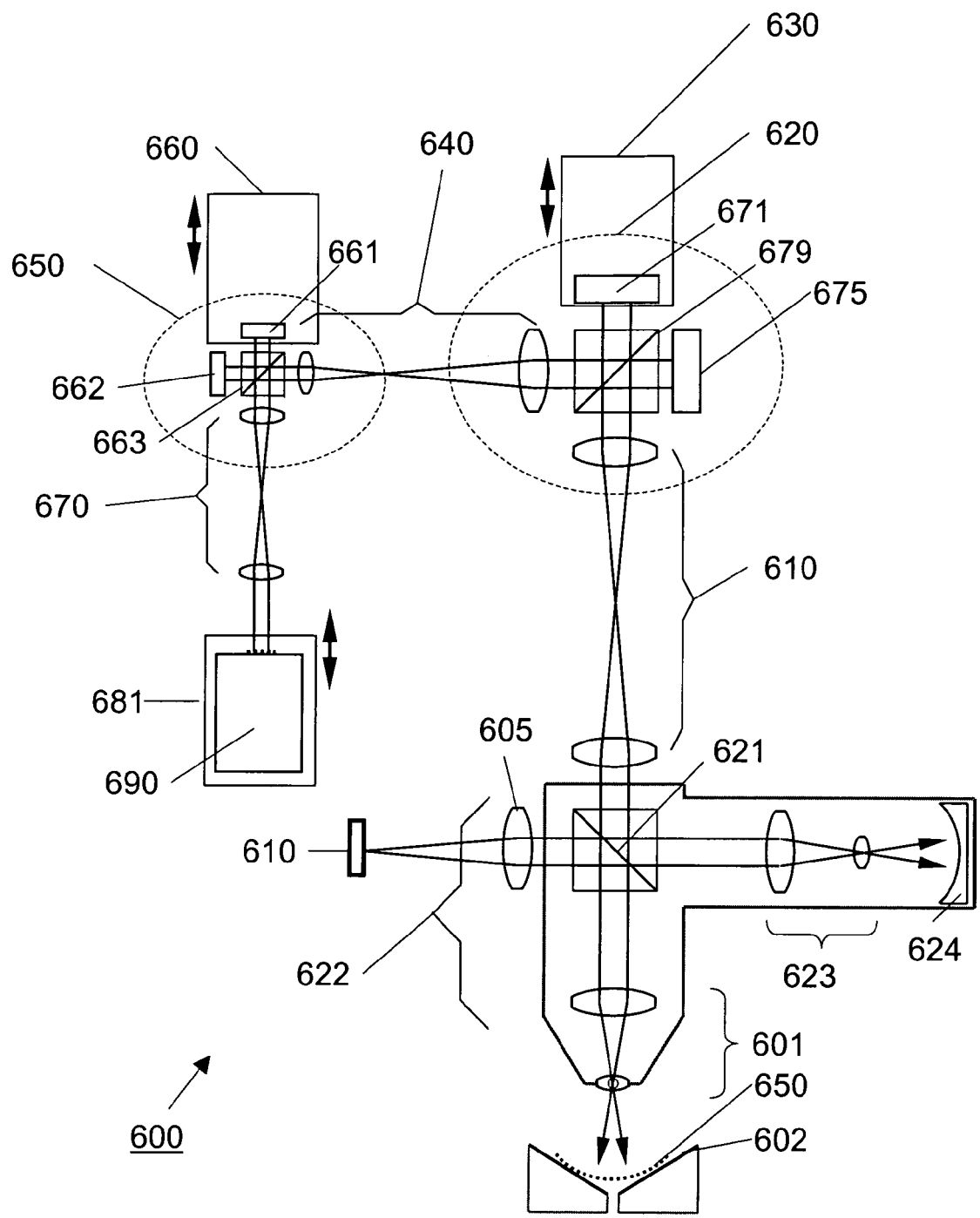
FIG. 6 is a schematic diagram of an interferometry system including two remote cavities.

In some cases, it may desirable to extend the scan range in a non-telecentric or variable magnification optical system. In some embodiments, the scan range can be extended by including more than one remote cavity, wherein the different remote cavities have different NA's. Referring to FIG. 6, one such embodiment is system 600, which includes two remote cavities, namely first remote cavity 620 and second remote cavity 650. Main cavity 622 is similar to main cavity 320 of system 300 (see FIG. 3), and produces a spherical optical measurement surface 650 for profiling test surface 602. Main cavity 622 accepts illumination from an extended light source 610 via an illuminator lens 605. Main cavity includes a NPBS 621, a reference mirror 624, reference optics 623, and measurement optics 601. First remote cavity 620 includes a NPBS 679, a remote measurement mirror 671, and a remote reference mirror 675. Second remote cavity 650 includes BS 663, remote measurement mirror 661, and remote reference mirror 662. Remote measurement mirrors 671 and 661 are mounted on OPD scan stages 630 and 660, respectively. System 600 also includes first relay optics 610 and second relay optics 640, which relay light between main cavity 622 and first remote cavity 620, and first remote cavity 620 and second remote cavity 650, respectively. Relay optics 670 relay light from second remote cavity 650 to a camera 690, which is mounted on a focus scan stage 681.

In this case, the total OPD introduced to the measurement and reference beams by the three cavities as a function of ray angle, α, is given by $$OPD_{total}(\alpha) = \delta_0 \cos(\alpha) - \delta' \cos(s\alpha) - \delta'' \cos(s''\alpha) \quad (14)$$

where $\delta_0$, $\delta'$, and s are defined as for Equation 4, above, $\delta''$ is the OPD for chief rays introduced by second remote cavity 650, and $$s'' = \frac{\alpha''}{\alpha},$$

where α" is the ray angle in second remote cavity 650 of a ray corresponding to the ray propagating at angle α in the main cavity. The second remote cavity provides an additional degree of freedom with which to match OPD's as a function of α.

Retaining terms up to third order in α, matching OPD for the chief and marginal rays simultaneously means finding values of $\delta'$ and $\delta''$ such that:

$$\begin{cases} \delta' + \delta'' = \delta_0 \\ \delta' s^2 + \delta'' s''^2 = \delta_0 \end{cases} \quad (15)$$

This linear equation system provides a solution for any value of $\delta_0$, for given s and s". s and s" do change when the main cavity does not provide constant magnification as a function of the position of the test surface. The linear system provides the values of $\delta'$ and $\delta''$ as a function of the parameters that depend on the main cavity, namely $\delta_0$, s, and s".

When main cavity 622 has an NA better adapted first remote cavity 620, the primary OPD scanning is performed by first OPD scan stage 630. On the other hand, when main cavity 622 has an NA better adapted second remote cavity 650, it is rather second OPD scan stage 660 which is the primary mechanism for scanning. Combining simultaneously the two scanning mechanisms in appropriate proportion allows for a wide variety of optical characteristics for main cavity 622. Note that in the present embodiment, system 600 employs a coherence multiplexing scheme similar to that of system 500.

Figure 7:
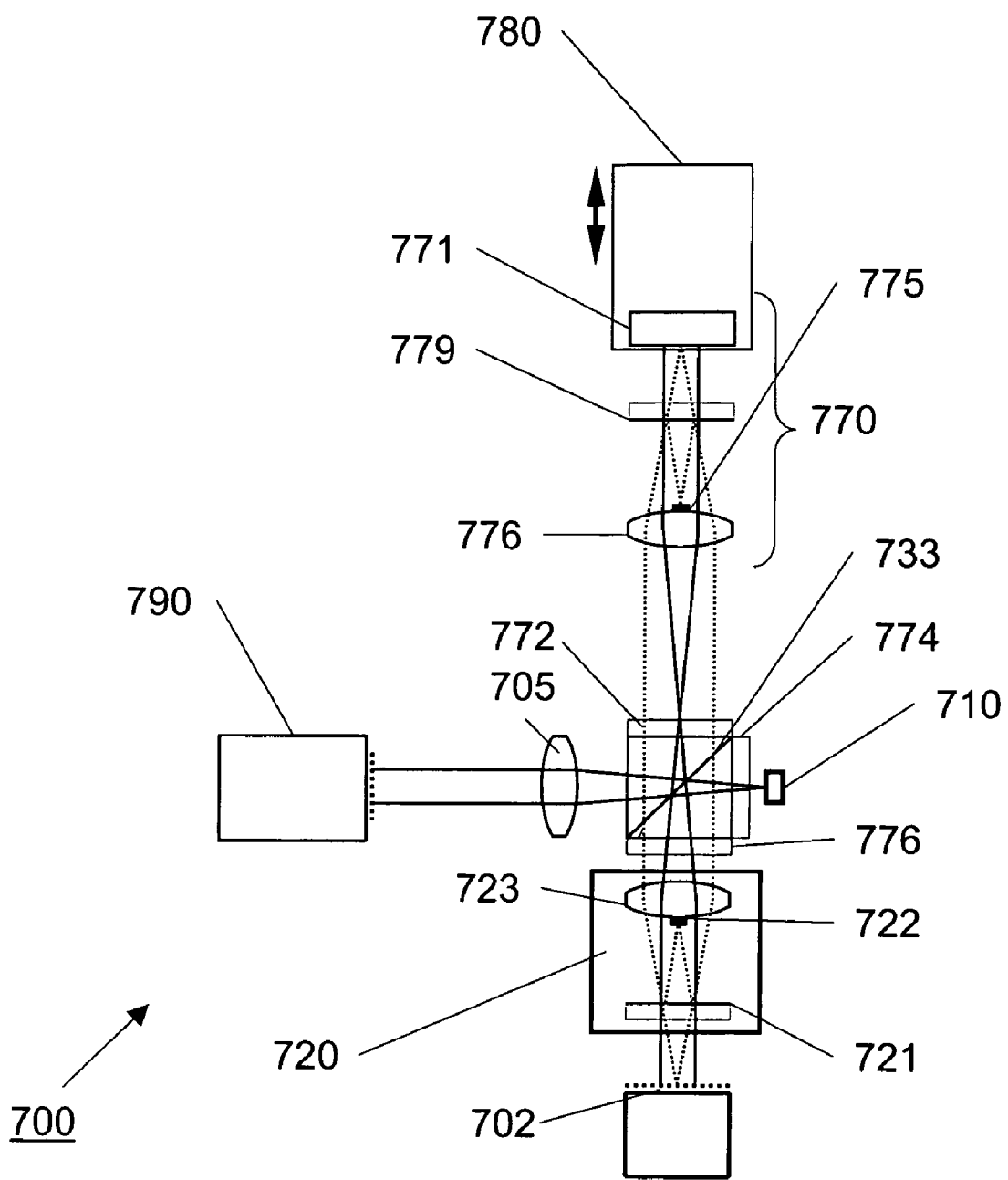
FIG. 7 is a schematic diagram of another embodiment of an interferometry system including coupled cavities and an extended light source.

Although all embodiments describes so far involve Michelson or Linnik interferometers as basic building blocks, many other types of interferometer will work as well. For example, referring to FIG. 7, a system 700 includes Mirau objectives and is configured for profiling a test surface 702. A main cavity in the form of a mirau objective 720 includes a plate beam splitter 721 and a main reference mirror 722 mounted adjacent an objective lens 723. A matched, remote Mirau optical system including a remote plate beam splitter 779, a remote measurement mirror 771 and a remote reference mirror 775 mounted on a lens 776. Remote measurement mirror 771 is mounted on an OPD scan stage 780, which provides OPD modulation. In the present geometry, there is assumed small offsets similar to the δz and δz' of system 500 (see FIG. 5), for coherence multiplexing. The combination of a PBS 733, a quarter wave plate 776 and a quarter wave plate 772 circulate illumination combining from an extended light source 710 between Mirau objective 720 and remote cavity 770. A polarizer 774 reduces unwanted transmission of light to lens 705 and camera 790.

In all of the foregoing embodiments, the interferometry systems takes into account that an extended source generates a range of illumination ray angles. The OPD between measurement and reference paths is a function of this ray angle and of the on-axis path imbalance in the main cavity. The remote cavity compensates this varying OPD imbalance for marginal rays, at every point of the field of view.

One solution includes using a single remote cavity that has the opposite on-axis path imbalance and where reference rays travel at the same angle that they travel in the main cavity. This is accomplished by placing the remote cavity in a space where the object surface is imaged at a finite distance, e.g., in an intermediate space (see, e.g., system 100 in FIG. 1), in object space (see, e.g., system 400 in FIG. 4) or similarly in camera space.

Another solution includes using multiple cavities (see, e.g., system 600 in FIG. 6), in which case the NA do not necessarily need to be matched in any one remote cavity. Some cavities can even be located in a space where the object image is rejected at infinity (cavity inside the imaging telecentric objective). However, at least one cavity should be placed in a space where an image of the object is created at finite distance so that rays in the beams travel at different angles within a remote cavity.

Although the embodiments described above are with respect to low coherence interferometry, other interferometry techniques can also be used. For example, interferometry methods using a long temporal coherence length light source (e.g., lasers) can also be used. One such technique is phase shifting interferometry (PSI). In PSI, the phase of a detected interference signal is varied by, e.g., varying the wavelength of the light source or dithering the position of a reference surface. The difference in phase of the interference signal as a function of wavelength or reference surface position relates directly to the total optical path difference in the interferometer. In PSI, interference images are acquired according to a phase-shifting algorithm so that each incremental change in interference signal can be related to a known wavelength change of, or OPD change between, reference and measurement wavefronts. Examples of PSI techniques can be found in U.S. Pat. No. 6,359,692, entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY," to Peter de Groot, U.S. patent application Ser. No. 10/144,527, entitled "APPARATUS AND METHOD FOR PHASE-SHIFTING INTERFEROMETRY," to Michael Kuchel et al., and U.S. Provisional Application Ser. No. 60/339,214, entitled "FREQUENCY TRANSFORM PHASE-SHIFTING INTERFEROMETRY," to Leslie L. Deck. Note that when using long temporal coherence length light source, the optical measurement surface can correspond to a constant but non-zero OPD.

Long wavelength (e.g., infrared, such as 0.75–10 μm) interferometry techniques can also be used in the aforementioned methods and systems. Surfaces that diffusely reflect visible wavelengths or light can appear specular to longer wavelengths. Hence, long wavelength sources can be used to characterize rough surfaces. Of course, for long wavelength interferometry, the system detector and optical components should be selected to perform appropriately at the light source wavelength. Long wavelength interferometry techniques are further described in U.S. Pat. No. 6,195,168, entitled "INFRARED SCANNING INTERFEROMETRY APPARATUS AND METHOD," to Xavier Colonna de Lega et al.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

imaging test light reflected from a test surface to interfere with reference light on a camera and form an interference pattern, the test light and reference light being derived from a spatially extended, common source, having a mean wavelength $\lambda$, and comprising chief rays and marginal rays that propagate along different paths, wherein the test light and reference light propagate along different paths in a main cavity comprising the test surface and also propagate along different paths in at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and adjusting the optical path difference $\delta_r$ to vary a total optical path difference between the chief rays at the camera, wherein the imaging comprises coupling the test light and reference light between the main cavity and the at least one remote cavity to cause a total optical path difference between the marginal rays of the test and reference light at the camera to be smaller than $\lambda$ when the total optical path difference between the chief rays of the test and reference light at the camera is zero.

2. The method of claim 1, wherein the imaging of the light derived from the spatially extended, common source causes the main cavity to introduce an optical path difference of at least about $\lambda$ between a marginal ray and a chief ray of test light incident on a common point of the test surface when $\delta_0$=10 mm.

3. The method of claim 1, wherein the common source has a temporal coherence length, and the optical path difference $\delta_r$ is adjusted over a range sufficient to cause the total optical path difference for the chief rays to vary over a range larger than the temporal coherence length.

4. The method of claim 1, wherein the optical path difference $\delta_r$ is adjusted over a range sufficient to cause the total optical path difference for the chief rays to pass through zero.

5. The method of claim 1, further comprising recording images of the interference pattern with the camera as a function of the adjusted optical path difference.

6. The method of claim 1, wherein the at least one remote cavity consists of one remote cavity and the single pass through the remote cavity introduces the optical path length difference $\delta_r$ between the chief rays.

7. The method of claim 6, wherein the imaging comprises coupling the test light and reference light between the main cavity and the remote cavity with unit magnification.

8. The method of claim 6, wherein the coupling comprises coupling the test light and reference light between the main cavity and the first cavity using 1:1 relay optics.

9. The method of claim 6, wherein the coupling comprises directly coupling the test light and reference light between the main cavity and the remote cavity without using any element having optical power.

10. The method of claim 1, wherein the test surface is planar.

11. The method of claim 1, wherein the chief rays for the test and reference light define an optical measurement surface corresponding to a theoretical test surface that would reflect the chief rays of the test light to produce a zero optical path length difference between them and the chief rays of the reference light over the camera, and
   wherein the imaging further comprises directing the test light to contact the test surface such that the adjustment of the optical path difference $\delta_r$ scans a position of a locally planar portion of the optical measurement surface over at least a portion of the test surface.

12. The method of claim 1, wherein the test surface is curved.

13. The method of claim 1, wherein the chief rays for the test and reference light define an optical measurement surface corresponding to a theoretical test surface that would reflect the chief rays of the test light to produce a zero optical path length difference between them and the chief rays of the reference light over the camera, and
   wherein the imaging further comprises directing the test light to contact the test surface such that the adjustment of the optical path difference $\delta_r$ scans a radius of a locally spherical portion of the optical measurement surface over at least a portion of the test surface.

14. The method of claim 1, wherein the main cavity and the remote cavities direct the test light and reference light along their different paths using polarizing beam splitting surfaces.

15. The method of claim 1, wherein the main cavity and the remote cavities direct the test light and reference light along their different paths using non-polarizing beam splitting surfaces.

16. The method of claim 1, wherein the total optical path difference between the marginal rays of the test and reference light at the camera is smaller than 0.5 $\lambda$ when the total optical path difference between the chief rays of the test and reference light at the camera is zero.

17. The method of claim 1, wherein the total optical path difference between the marginal rays of the test and reference light at the camera is smaller than 0.1 $\lambda$ when the total optical path difference between the chief rays of the test and reference light at the camera is zero.

18. A method comprising:
   imaging test light reflected from a test surface to interfere with reference light on a camera and form an interference pattern, the test light and reference light being derived from a common source, having a mean wavelength $\lambda$, and comprising chief rays and marginal rays,
   wherein the test light and reference light propagate along different paths in a main cavity comprising the test surface and also propagate along different paths in at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and
   adjusting the optical path difference $\delta_r$ to vary a total optical path difference between the chief rays at the camera,
   wherein the imaging comprises coupling the test light and reference light between the cavities to cause a total optical path difference between the marginal rays of the test and reference light at the camera to be smaller than $\lambda$ when the total optical path difference between the chief rays of the test and reference light at the camera is zero, and the test and reference light make two passes through the at least one remote cavity and one pass through the main cavity, the first pass through the remote cavities is from the common source to the main cavity and the second pass through the remote cavities is from the main cavity to the camera.

19. The method of claim 18, wherein the total optical path difference for the chief rays is equal to $\delta_0 + 2\delta_r$.

20. A method comprising:
   imaging test light reflected from a test surface to interfere with reference light on a camera and form an interference pattern, the test light and reference light being derived from a common source, having a mean wavelength $\lambda$, and comprising chief rays and marginal rays,
   wherein the test light and reference light propagate along different paths in a main cavity comprising the test surface and also propagate along different paths in at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and
   adjusting the optical path difference $\delta_r$ to vary a total optical path difference between the chief rays at the camera,
   wherein the imaging comprises coupling the test light and reference light between the cavities to cause a total optical path difference between the marginal rays of the test and reference light at the camera to be smaller than $\lambda$ when the total optical path difference between the chief rays of the test and reference light at the camera is zero, the at least one remote cavity consists of one remote cavity and the single pass through the remote cavity introduces the optical path length difference $\delta_r$ between the chief rays, and the imaging produces an intermediate image of the test surface in the remote cavity that has an inverse magnification s that satisfies:

$$1 - \frac{1.2\lambda}{\delta_0 \alpha_m^2} < s^2 < 1 + \frac{1.2\lambda}{\delta_0 \alpha_m^2},$$

where $\alpha_m$ is a maximum ray angle for a marginal ray relative to a chief ray for test light on the test surface.

21. A method comprising:
   imaging test light reflected from a test surface to interfere with reference light on a camera and form an interference pattern, the test light and reference light being derived from a common source, having a mean wavelength $\lambda$, and comprising chief rays and marginal rays,
   wherein the test light and reference light propagate along different paths in a main cavity comprising the test surface and also propagate along different paths in at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and adjusting the optical path difference $\delta_r$ to vary a total optical path difference between the chief rays at the camera, wherein the imaging comprises coupling the test light and reference light between the cavities to cause a total optical path difference between the marginal rays of the test and reference light at the camera to be smaller than $\lambda$ when the total optical path difference between the chief rays of the test and reference light at the camera is zero, and the at least one remote cavity comprises a first remote cavity and a second remote cavity.

22. The method of claim 21, wherein adjusting the optical path difference $\delta_r$ comprises adjusting an optical path difference between the test light and reference light in the first remote cavity.

23. The method of claim 22, wherein adjusting the optical path difference $\delta_r$ further comprises adjusting an optical path difference between the test light and reference light in the second remote cavity.

24. The method of claim 23, further comprising recording images of the interference pattern with the camera as a function of the adjusted optical path length difference in the first and second remote cavities.

25. A method comprising:

imaging test light reflected from a test surface to interfere with reference light on a camera and form an interference pattern, the test light and reference light being derived from a common source, having a mean wavelength $\lambda$, and comprising chief rays and marginal rays, wherein the test light and reference light propagate along different paths in a main cavity comprising the test surface and also propagate along different paths in at least one remote cavity, and wherein a single pass through the main cavity introduces a non-zero optical path difference $\delta_0$ between the chief rays of the test and reference light and a single pass through the remote cavities introduce an optical path length difference $\delta_r$ between the chief rays of the test and reference light; and adjusting the optical path difference $\delta_r$ to vary a total optical path difference between the chief rays at the camera, wherein the imaging comprises coupling the test light and reference light between the cavities to cause a total optical path difference between the marginal rays of the test and reference light at the camera to be smaller than $\lambda$ when the total optical path difference between the chief rays of the test and reference light at the camera is zero, and the chief rays for the test and reference light define an optical measurement surface corresponding to a theoretical test surface that would reflect the chief rays of the test light to produce a zero optical path length difference between them and the chief rays of the reference light over the camera, and the imaging further comprises adjusting a position of the camera relative to an image of the optical measurement surface nearest the camera while adjusting the optical path difference $\delta_r$.

26. The method of claim 25, wherein the position of the camera relative to the image of the optical measurement surface is adjusted while adjusting the optical path difference $\delta_r$ to maintain the optical measurement surface within a depth of focus of an imaging system used to image the test light to the camera.

27. A method comprising:

imaging test light reflected from a test surface to interfere with reference light on a camera and form an interference pattern, wherein the test light and reference light are derived from an extended, common source, having a mean wavelength $\lambda$, and comprising chief rays and marginal rays, and wherein the test light and reference light propagate along different paths in a main cavity comprising the test surface and at least two remote cavities;

adjusting an optical path difference between the test light and reference light in at least one of the remote cavities; and recording images of the interference pattern with the camera as a function of the adjusted optical path length difference in the at least one remote cavity.

28. The method of claim 27, wherein the imaging comprises coupling the test light and reference light between the cavities to cause a total optical path difference between the marginal rays of the test and reference light at the camera to be smaller than $\lambda$ when an total optical path difference between the chief rays of the test and reference light at the camera is zero.

29. A method comprising:

imaging test light reflected from a test surface to interfere with reference light on a camera and form an interference pattern, wherein the test light and reference light are derived from an extended, common source, and wherein the test light and reference light propagate along different paths in a main cavity comprising the test surface and at least one remote cavity; and adjusting an optical path difference between the test light and reference light in at least a first of the at least one remote cavity;

wherein chief rays for the test and reference light define an optical measurement surface corresponding to a theoretical test surface that would reflect the chief rays of the test light to produce a zero optical path length difference between them and the chief rays of the reference light over the camera, and wherein the imaging comprises directing the test light to contact the test surface such that the adjustment of the optical path difference in the first remote cavity adjusts a radius of a locally spherical portion of the optical measurement surface over at least a portion of the test surface.

30. An apparatus comprising:

an interferometric imaging system configured to image test light reflected from a test surface to interfere with reference light on a camera and form an interference pattern, the test light and reference light being derived from a spatially extended, common source, having a mean wavelength $\lambda$, and comprising chief rays and marginal rays that propagate along different paths, the interferometric imaging system comprising:

a first set of elements forming a main cavity with the test surface;

a second set of elements forming at least one remote cavity, wherein the test light and reference light propagate along different paths in each of the cavities, and a first stage configured to scan an optical path difference between the test light and the reference light in the remote cavities, wherein the interferometric imaging system is configured so that a single pass through the main cavity introduces a non-zero optical path difference $\delta_0$ between the chief rays of the test and reference light and a single pass through the at least one remote cavity introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero.

31. The apparatus of claim 30, wherein the main cavity introduces an optical path difference of at least about $\lambda$ between a marginal ray and a chief ray of test light incident on a common point of the test surface when $\delta_0=10$ mm.

32. The apparatus of claim 30, wherein the interferometric imaging system further comprises relay optics configured to couple the test light and reference light between the main cavity and the remote cavities, wherein the relay optics provide unit magnification.

33. The apparatus of claim 30, wherein the chief rays for the test and reference light define an optical measurement surface corresponding to a theoretical test surface that would reflect the chief rays of the test light to produce a zero optical path length difference between them and the chief rays of the reference light over the camera, and wherein the first set of elements is configured to direct the test light to contact the test surface such that the optical path difference scan by the stage scans a radius of a locally spherical portion of the optical measurement surface over at least a portion of the test surface.

34. The apparatus of claim 30, wherein the first set of elements comprises a polarizing beam splitter configured to direct the test and reference light along different paths in the main cavity.

35. The apparatus of claim 30, wherein the first set of elements comprises a non-polarizing beam splitter configured to direct the test and reference light along different paths in the main cavity.

36. The apparatus of claim 30, wherein the interferometric imaging system comprises a Linnik interferometer.

37. The apparatus of claim 30, wherein the interferometric imaging system comprises a Michelson interferometer.

38. The apparatus of claim 30, wherein the interferometric imaging system comprises a Mirau interferometer.

39. The apparatus of claim 30, wherein the at least one remote cavity consists of one remote cavity.

40. A system, comprising:
a camera;
an electronic controller; and
an interferometric imaging system configured to image test light reflected from a test surface to interfere with reference light on the camera and form an interference pattern, the test light and reference light being derived from a spatially extended common source, having a mean wavelength $\lambda$, and comprising chief rays and marginal rays that propagate along different paths,
the interferometric imaging system comprising:
a first set of elements forming a main cavity with the test surface;
a second set of elements forming at least one remote cavity, wherein the test light and reference light propagate along different paths in each of the cavities, and
a first stage configured to scan an optical path difference between the test light and the reference light in the remote cavities,
wherein the interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero, and the electronic controller is configured to cause the stage to scan the optical path difference and record images from the camera as a function of the optical path length scan.

41. A system, comprising:
a spatially extended source; and
an interferometric imaging system configured to image test light reflected from a test surface to interfere with reference light on a camera and form an interference pattern, the test light and reference light being derived from the spatially extended source, having a mean wavelength $\lambda$, and comprising chief rays and marginal rays that propagate along different paths,
the interferometric imaging system comprising:
a first set of elements forming a main cavity with the test surface;
a second set of elements forming at least one remote cavity, wherein the test light and reference light propagate along different paths in each of the cavities, and
a first stage configured to scan an optical path difference between the test light and the reference light in the remote cavities,
wherein the interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero.

42. An apparatus comprising:
an interferometric imaging system configured to image test light reflected from a test surface to interfere with reference light on a camera and form an interference pattern, the test light and reference light being derived from a spatially extended common source, having a mean wavelength $\lambda$, and comprising chief rays and marginal rays, the interferometric imaging system comprising:

a first set of elements forming a main cavity with the test surface;

a second set of elements forming at least one remote cavity, wherein the test light and reference light propagate along different paths in each of the cavities, and a first stage configured to scan an optical path difference between the test light and the reference light in the remote cavities, wherein the interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero, and wherein the chief rays for the test and reference light define an optical measurement surface corresponding to a theoretical test surface that would reflect the chief rays of the test light to produce a zero optical path length difference between them and the chief rays of the reference light over the camera, and wherein the apparatus further comprises a focus scan stage configured to adjust a position of the camera relative to an image of the optical measurement surface nearest the camera while the first stage adjusts the optical path difference $\delta_r$.

43. The apparatus of claim 42, wherein the camera is mounted on the focus stage and during operation focus stage adjusts the position of the camera relative to the test surface to maintain the optical measurement surface within a depth of focus of the interferometric imaging system.

44. The apparatus of claim 42, wherein the apparatus further comprises at least one imaging component mounted on the focus stage and during operation focus stage adjusts the position of the imaging component relative to the test surface to maintain the optical measurement surface within a depth of focus of the interferometric imaging system.

45. An apparatus comprising:

an interferometric imaging system configured to image test light reflected from a test surface to interfere with reference light on a camera and form an interference pattern, the test light and reference light being derived from a spatially extended common source, having a mean wavelength $\lambda$, and comprising chief rays and marginal rays, the interferometric imaging system comprising:

a first set of elements forming a main cavity with the test surface;

a second set of elements forming at least one remote cavity, wherein the test light and reference light propagate along different paths in each of the cavities, and a first stage configured to scan an optical path difference between the test light and the reference light in the remote cavities, wherein the interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero, and wherein the second set of elements forms a first remote cavity and a second remote cavity and wherein the marginal rays in the first remote cavity propagate relative to the chief rays at a first angle, and the marginal rays in the second remote cavity propagate relative to the chief rays at a second angle different from the first angle.

46. An apparatus comprising:

an interferometric imaging system configured to image test light reflected from a test surface to interfere with reference light on a camera and form an interference pattern, the test light and reference light being derived from a spatially extended common source, having a mean wavelength $\lambda$, and comprising chief rays and marginal rays, the interferometric imaging system comprising:

a first set of elements forming a main cavity with the test surface;

a second set of elements forming at least one remote cavity, wherein the test light and reference light propagate along different paths in each of the cavities, and a first stage configured to scan an optical path difference between the test light and the reference light in the remote cavities, wherein the interferometric imaging system is configured so that a single pass through the main cavity introduces a non-zero optical path difference $\delta_0$ between the chief rays of the test and reference light and a single pass through the remote cavities introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero, and wherein the at least one remote cavity comprises multiple remote cavities.

47. An apparatus comprising:

an interferometric imaging system configured to image test light reflected from a test surface to interfere with reference light on a camera and form an interference pattern, the test light and reference light being derived from a spatially extended, common source, having a mean wavelength $\lambda$, and comprising chief rays and marginal rays that propagate along different paths, wherein during operation the interferometric imaging system defines a main cavity comprising the test surface and further defines at least one remote cavity, and is configured to direct the test light and reference light to propagate along different paths in each of the main cavity and the at least one remote cavity, the interferometric imaging system comprising:

a stage configured to scan an optical path length difference between the test light and the reference light in a first of the at least one remote cavity, a first detachable, optical assembly configured to form the main cavity with the test surface when the test surface comprises a locally planar region and when attached to the remainder of the interferometric imaging system; and a second detachable, optical assembly configured to form the main cavity with the test surface when test surface comprises a locally spherical region and when attached to the remainder of the interferometric imaging system, wherein the interferometric imaging system is configured so that a single pass through the main cavity introduces a non-zero optical path difference $\delta_0$ between the chief rays of the test and reference light and a single pass through the at least one remote cavity introduce an optical path length difference $\delta_r$ between the chief rays of the test and reference light, and during operation the first stage adjusts the optical path difference $\delta_r$ to vary a total optical path difference between the chief rays at the camera, and the interferometric imaging system couples the test light and reference light between the cavities to cause a total optical path difference between the marginal rays of the test and reference light at the camera to be smaller than $\lambda$ when the total optical path difference between the chief rays of the test and reference light at the camera is zero.

* * * * *